US006992757B2

(12) United States Patent
Holcomb et al.

(10) Patent No.: US 6,992,757 B2
(45) Date of Patent: Jan. 31, 2006

(54) METHOD AND SYSTEM FOR ENCODING FLUID LEVEL

(75) Inventors: Dirk Holcomb, Flowery Branch, GA (US); Steven Jackson, Norcross, GA (US)

(73) Assignee: Varec, Inc., Norcross, GA (US)

( * ) Notice: Subject to any disclaimer, the term of this patent is extended or adjusted under 35 U.S.C. 154(b) by 0 days.

(21) Appl. No.: 10/955,485

(22) Filed: Sep. 30, 2004

(65) Prior Publication Data

US 2005/0274915 A1  Dec. 15, 2005

Related U.S. Application Data

(60) Provisional application No. 60/579,275, filed on Jun. 14, 2004.

(51) Int. Cl.
 *G01J 1/42* (2006.01)
(52) U.S. Cl. ............... 356/218; 356/221; 356/222; 73/293; 73/291
(58) Field of Classification Search ........ 356/218–222, 356/246; 73/322, 293, 291; 250/227.5, 250/233, 236, 237 R
See application file for complete search history.

(56) References Cited

U.S. PATENT DOCUMENTS

| 3,956,681 A | 5/1976 | Vail et al. |
| 3,975,633 A | 8/1976 | Larkin |
| 4,236,144 A | 11/1980 | Sunagawa |
| 4,275,382 A | 6/1981 | Jannotta |
| 4,342,996 A | 8/1982 | Jannotta |
| 4,786,846 A | 11/1988 | Uchida |
| 4,924,700 A | 5/1990 | Habart |
| 5,065,013 A * | 11/1991 | Taylor .................. 250/231.18 |
| 5,103,225 A * | 4/1992 | Dolan et al. ................. 341/13 |
| 5,136,883 A | 8/1992 | Jannotta |
| 5,243,860 A | 9/1993 | Habart |
| 5,432,711 A | 7/1995 | Jackson |
| 5,596,188 A | 1/1997 | McElroy |
| 5,655,403 A | 8/1997 | Topliff |
| 5,655,841 A | 8/1997 | Storm |
| 5,705,733 A | 1/1998 | Jannotta |
| 6,708,562 B2 * | 3/2004 | Kruger et al. ................ 73/314 |

OTHER PUBLICATIONS http://www.gaugingsystemsinc.com/aticle'id'50.cfm, Gauging Systems Inc. webpage for GSI Transmitter Cards, Composed: Aug. 26, 2002 | Modified: Nov. 19, 2002, pp. 1-2.
http://www.gaugingsystemsinc.com/article'id'87.cfm, Gauging Systems Inc. webpage for GSI-2000/APTB Transmitter, Composed: Nov. 5, 2002 | Modified: Nov. 5, 2002, pp. 1-3.

(Continued)

*Primary Examiner*—Layla G. Lauchman
(74) *Attorney, Agent, or Firm*—King & Spalding LLP

(57) ABSTRACT

A level transmitter can generate a level measurement signal according to the position of a float that follows fluid level in a tank. The transmitter can comprise an optical encoder with a patterned disk that is linked to the float so that fluid level change produces disk rotation. An array of optical sensors positioned on one side of the disk can read reflective and absorptive patches attached to the disk's surface to identify disk position and disk rotation. One or more of the sensors can collect a signal from a reference area of the disk. Circuitry can compare the signals output by each data sensor to the reference signal to enhance binary classification of each acquired data signal. The transmitter can operate in multiple encoding modes, each of which can provide a level of redundancy.

43 Claims, 15 Drawing Sheets

OTHER PUBLICATIONS http://www.gaugingsystemsinc.com/article'id'21.cfm, Gauging Systems Inc. webpage for Fiber Ethernet Tank Farm Topology, Composed: Jul. 7, 2002 | Modified: Nov. 7, 2003, pp. 1-4.

Fairchild Semiconductor Corporation, Datasheet for QRE1113.GR Reflective Object Sensor; Apr. 4, 2001; pp. 1-4.

* cited by examiner

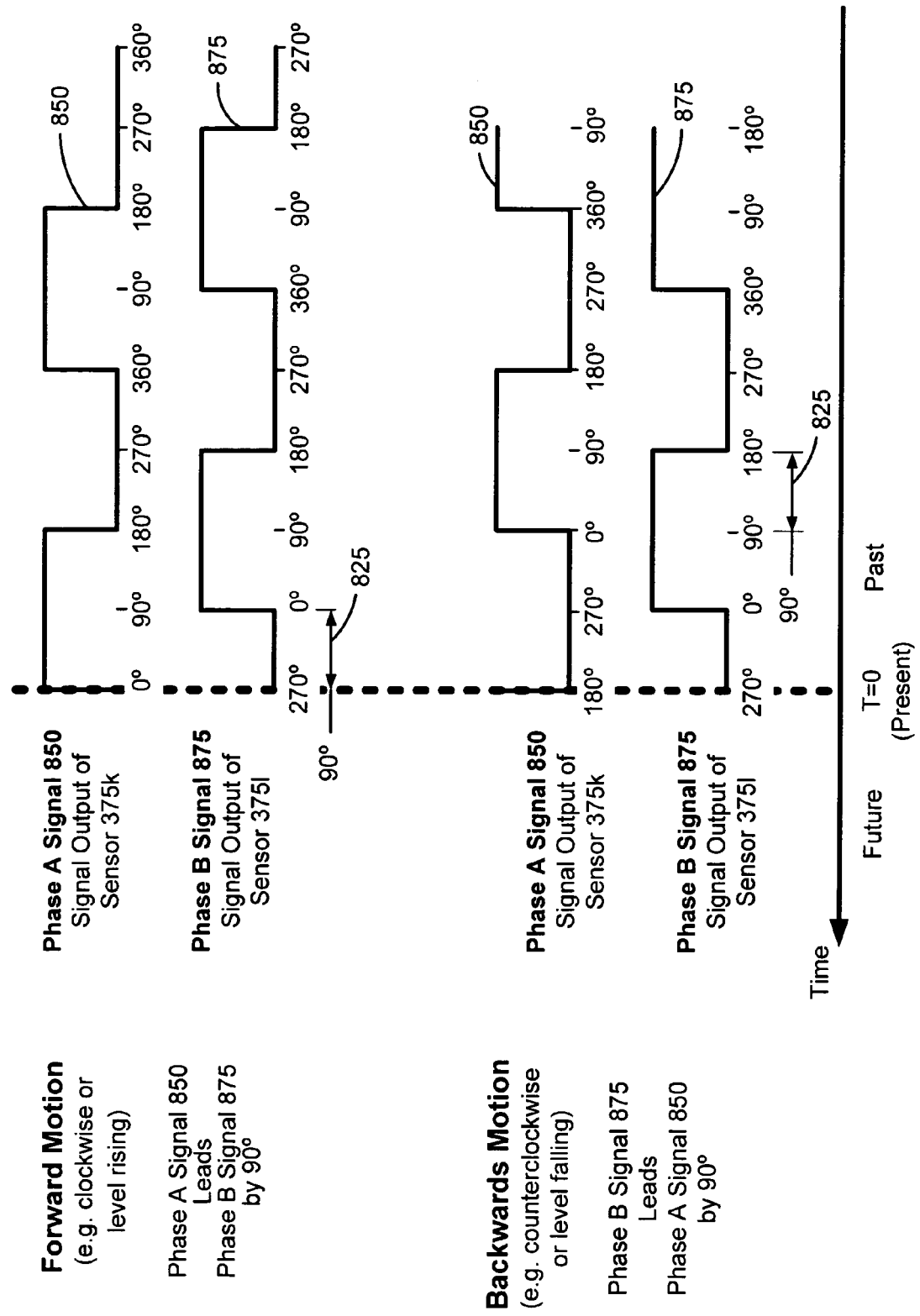

METHOD AND SYSTEM FOR ENCODING FLUID LEVEL

CROSS-REFERENCE TO RELATED APPLICATION

This application claims priority to and the benefit of the filing date of U.S. provisional application Ser. No. 60/579,275, entitled "Optical Level Transmitter for Mechanical Float and Tape Level Gauge," filed Jun. 14, 2004, which is entirely incorporated herein by reference.

TECHNICAL FIELD

The present invention generally relates to instrumentation that measures the fluid level of a tank and, more particularly, to fluid level transmitters that have optical encoders for coding information about a tank's fluid level based on measurements of one or more rotating encoder disks.

BACKGROUND OF THE INVENTION

Level instrumentation provides fluid level measurements for a variety of purposes and in diverse fields. To name a few applications, oil and gasoline tank farms, waste water treatment facilities, and chemical plants utilize level instrumentation to determine the amount of material present in tanks and other vessels in connection with material storage and processing operations.

In a common type of level instrument, a float rides on the surface of the material in a tank and conveys motion to an optical encoder in a level transmitter system that is mounted to outside of the tank. Movement of the float stemming from change in the tank's fluid level drives rotation of an optical encoder disk within the encoder. The encoder disk is typically radially segmented with optically transparent regions spaced between opaque regions. A set of light emitting diodes ("LEDs") arranged to face one side of the encoder disk emit light towards a set of aligned photoreceptors mounted to face the opposite side of the disk. Dependent upon the rotational position of the encoder disk, light from each LED either transmits through one of the transparent regions for reception by an aligned photoreceptor or is blocked by an opaque region. The encoder generates a code based on the pattern of photoreceptors that are in the binary state of receiving transmitted light verses in the opposite binary state of receiving little or no light. Since rotation of the encoder disk is coupled to the tank's fluid level, this code carries information describing a tank's fluid level.

One disadvantage of such conventional encoder systems is their susceptibility to age and environmental effects. The optical transparency of the encoder disk, the light intensity output by the LEDs, the responsiveness of the photoreceptors, and the performance of the associated mechanical and electrical components can each degrade with time and usage. Such degradation can decrease the encoder's ability to discern disk position and can result in unacceptable performance.

Conventional level transmitters typically use exactly one encoding technique, either absolute encoding or incremental encoding, to determine tank level according to disk position. Absolute encoding determines fluid level according to the absolute position of one or more encoder disks. The level sensing system maps each absolute bit code produced by the encoder to a resolvable tank level, in one-to-one correspondence. Conventional transmitters employing absolute encoding systems often struggle to track rapid changes in fluid level and thus may be prone to unacceptable performance in certain application conditions.

While incremental encoders are usually more responsive and thus may track rapid changes in fluid level, they too have disadvantages. Incremental encoding determines tank level based on encoder disk rotation as determined by counting encoder pulses. Using a known tank level that is typically acquired manually as a starting reference point, the level measurement system computes subsequent tank level measurements by monitoring change in level and accumulating the change to that starting-point level. Incremental-based measurements are typically susceptible to accumulated error that can result from power interruption or failing to detect one or more pulses.

Thus, a heretofore unmet need exists in the industry to address the aforementioned deficiencies and inadequacies.

SUMMARY OF THE INVENTION

The present invention supports transmitting optically encoded level measurements with a high degree of signal integrity and operational reliability. In one aspect of the present invention, a level transmitting system can be linked to a float or another buoyant object, or a submersible plumb, that provides motion or variable tension in correspondence to change in the level of a fluid or other material. Change in fluid level can yield vertical motion of the float that can in turn drive movement of a component, such as rotation of a disk. An optical measurement of disk rotation, such as rotational position or rotational rate, can provide an indication of fluid level. The disk can have a surface patterned with light and dark patches that respectively reflect and absorb incident light. The disk can rotate in front of an array of optical sensors that can determine the disk's rotational position. A circuit coupled to the sensor array can identify each individual sensor that is positioned over a reflective patch and each sensor in the array that is positioned over an absorptive patch. Each sensor in the array can emit light into a spatial zone through which the disk rotates and receive light from any reflective patches in that zone. Low signal intensity output from a sensor can correspond to the presence of an absorptive patch, while high intensity can indicate that a reflective patch is present in a sensor's field-of-view. Signals acquired from these sensors can provide a code that describes encoder disk rotation. The level transmitting system can correlate the code to a fluid level measurement.

In another aspect of the present invention, the disk can comprise a reference region that enhances the sensor circuit's ability to quickly and reliably distinguish between reflective patches and absorptive patches. One or more reference regions can be uniformly reflective or uniformly absorptive. An optical sensor positioned in front of the reference region can provide a reference signal having a similar intensity to the data signals that determine rotational position of the disk based on the absorptive and reflective patches. The circuit can compare the data signals from each position-detecting sensor to the reference signal to help determine whether a reflective or an absorptive patch is positioned in the field-of-view. Influences such as aging, wear, and environmental effects that cause variation in the disk, the sensors, and the circuit can uniformly affect the reference signals and the positional data signals. Comparing the positional data signals to the reference signal can enhance signal integrity by compensating for these effects and other sources of signal degradation.

In yet another aspect of the present invention, a level transmitter can operate in two or more encoding modes, each of which can provide a level of operational redundancy. The transmitter can select an encoding mode or switch between encoding modes based on the level of performance associated with another encoding mode. An absolute encoding mode can provide level measurement based on the absolute position of an encoder disk, which can be directly correlated to the output pattern of the data sensor array. A differential encoding mode can determine a change in level based on rotational rate of the disk by counting sensor pulses or transitions between light and dark patches. The differential encoding mode can use a previously acquired absolute level measurement as a baseline to which level changes are added or subtracted. In a third mode of encoder operation, the encoder can digitize each positional data signal and algorithmically determine whether the digital representation corresponds to a reflective or an absorptive patch or portion of a rotating encoder disk.

Other systems, methods, features, and advantages of the present invention will be or become apparent to one with skill in the art upon examination of the following drawings and detailed description. It is intended that all such additional systems, methods, features, and advantages be included within this description, be within the scope of the present invention, and be protected by the accompanying claims.

BRIEF DESCRIPTION OF THE DRAWINGS

Many aspects of the invention can be better understood with reference to the following drawings. The components in the drawings are not necessarily to scale, emphasis instead being placed upon clearly illustrating the principles of exemplary embodiments of the present invention. Moreover, in the drawings, reference numerals designate corresponding parts throughout the several views.

FIG. 8B illustrates the relative timing of representative signal outputs of the sensors of FIG. 8A resulting from rotating the encoder disk clockwise and counterclockwise in accordance with an exemplary embodiment of the present invention.

DETAILED DESCRIPTION OF THE EXEMPLARY EMBODIMENTS

Figure 1:
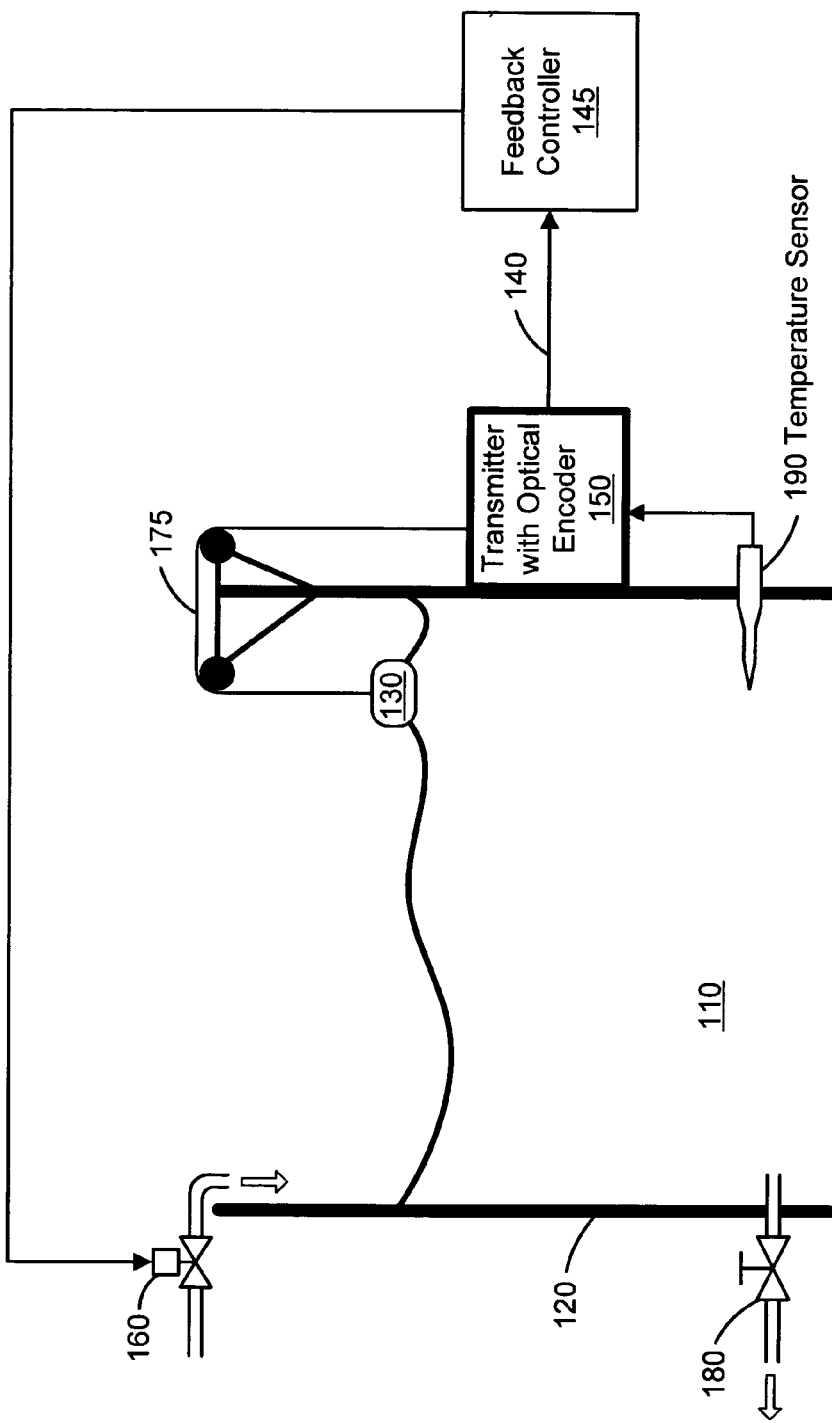
FIG. 1 is an illustration of an exemplary implementation of a level transmitter in a tank level control environment in accordance with an embodiment of the present invention.
Figure 2:
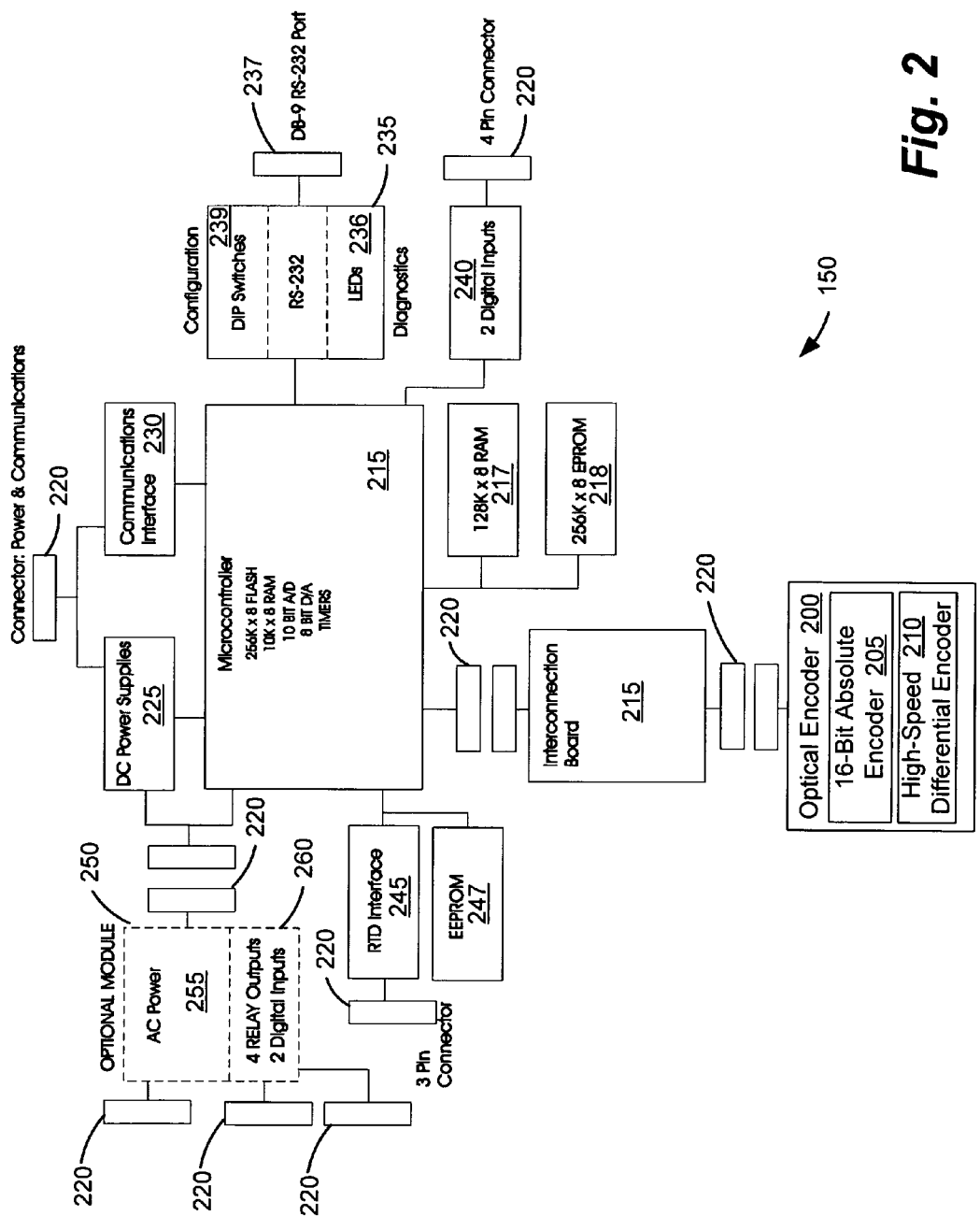
FIG. 2 is an exemplary functional block diagram of a level transmitter in accordance with an embodiment of the present invention.

Exemplary embodiments of the present invention can optically encode a mechanically oriented level measurement of a tank or similar vessel to provide a level measurement signal suitable for transmitting to a receiving device such as a level controller. A method and system for optically encoding level measurements will now be described more fully hereinafter with reference to FIGS. 1–14, in which embodiments of the invention are shown. FIG. 1 provides an illustration of an exemplary implementation of a level sensing and control system that comprises an optically encoded level transmitter. FIG. 2 provides a block diagram of an exemplary level transmitter, with the configuration and operability of the transmitter's encoder module illustrated in more detail in FIGS. 3–9. FIG. 7 relates to the encoder's absolute measurement mode, while FIGS. 8A, 8B, and 9 relate to the encoder's differential measurement mode. FIGS. 10–14 are flowcharts illustrating exemplary processes for optically encoding level measurements.

This invention can be embodied in many different forms and should not be construed as limited to the embodiments set forth herein; rather, these embodiments are provided so that this disclosure will be thorough and complete, and will fully convey the scope of the invention to those having ordinary skill in the art. Furthermore, all "examples" given herein are intended to be non-limiting, and among others supported by exemplary embodiments of the present invention.

Turning now to FIG. 1, this figure illustrates an exemplary implementation of a fluid level transmitter 150 as a component in a tank level control system 100 in accordance with an embodiment of the present invention. The control system 100 maintains a selected tank level or amount of material 110 in the tank 120.

The tank 120 may contain an arbitrary fluid 110 such as water, gasoline, oil, paint, etc. A buoyant object such as a float 130 floats on the surface of the fluid 130 and moves up or down as the fluid level of the tank 120 changes. A tape 175, line, flexible component, or other linkage conveys vertical float motion to the optical encoder (not shown in FIG. 1) of the level transmitter 150. A dampening assembly (not shown), such as a "stilling well," can suppress waves on the surface of the liquid 110, as may arise from tank agitation, to steady the float 130.

The material 110 in the tank 120 can be a homogenous fluid or can comprise layers of material. For example, the float 130 can be suspended on the top surface of a layer of oil, with layers of wax, heavy hydrocarbon, or water underneath. Alternatively, the float 130 can be suspended on the interface between two such material layers. In one exemplary embodiment of the present invention, the transmitter 150 moves a plumb (not shown) vertically in the tank 120 to detect the interfaces between the material layers based on line tension.

Whether homogenous or stratified, the level of the tank 110 may vary with environmental temperature due to thermal expansion or contraction of the fluid 110 and the tank 110 while the actual amount of fluid matter remains constant. That is, under certain circumstances, a raw measurement of the level of the tank 110 may not singularly determine the true amount of material in the tank 110. One or more temperature probes 190, for example resistive temperature devices ("RTDs"), provide the transmitter 150 with a temperature measurement of the tank's fluid 110. Using this temperature measurement as the basis for temperature compensation, the transmitter 150 can provide either a raw level measurement or an adjusted measurement. For example, the transmitter 150 can provide a measurement of the volume of the fluid 110 at a standardized temperature such as 60° C. in accordance with a customer specification or an industry convention.

The level transmitter 150 sends a level measurement signal to the feedback control system 145 via a communication link 140 that may convey information electrically, optically, or wirelessly. The controller 145 uses the level measurement from the transmitter 150 as feedback for maintaining the level of the tank 120 at a designated or operator-selected setting. If the level measurement falls below the level setting, the controller 145 automatically opens an inlet valve 160 to add more fluid into the tank 110. Likewise, if the level measurement is above the level setting, the controller 145 closes this valve 160. In this manner, the controller 145 can maintain the tank's fluid level at or near a desired value as fluid leaves the tank 110 through an outlet valve 180.

Turning now to FIG. 2, this figure illustrates an exemplary functional block diagram of a level transmitter, such as the transmitter 150 illustrated in FIG. 1 and discussed above, in accordance with an embodiment of the present invention. The transmitter 150 comprises an optical encoder 200, also referred to as an optical sensor module, that is linked to the float 130.

As will be discussed in more detail below, the optical encoder 200 uses light and mechanical motion to convert movement or position of the float 130 into an electrical signal encoded with a measurement of the level. That is, the tape 175 conveys float displacement to the encoder 200, while the encoder's electrical, optical, and mechanical mechanisms generate an electrical signal representation of the level.

The encoder 200 comprises a 16-bit absolute encoder 205 and a high-speed differential encoder 210. The absolute encoder 205 provides a 16-bit word that is correlated to fluid level of the tank 120 so that each potential value of this word represents a resolvable level. That is, the encoder outputs a 16-bit word that specifies the fluid level as having one of 65,536 ($2^{16}$) values. The differential encoder 210 provides a fluid level measurement derived from change in level when the fluid level varies more rapidly than the absolute encoder 205 may support.

An interconnection board 215 carries the signals output by the encoder 200 for delivery to the microcontroller 215 and conveys control signals from the microcontroller 215 to the encoder 200. Connectors 220 couple the interconnection board 215 to the microcontroller 215 and to the encoder 200. These connectors 220 as well as the other connectors 220 in the encoder 150 facilitate assembling the transmitter 150 so that the transmitter components that consume electrical power are enclosed in an explosion proof housing (not shown).

The microcontroller 215 comprises a microprocessor (not shown) and other digital circuitry including flash memory, random access memory ("RAM"), a digital-to-analog converter ("DAC"), an analog-to-digital converter ("ADC"), and timers. Flash memory facilitates adding software functionality to the transmitter 150. The microcontroller 215 uses the RAM for data storage and program execution. The ADC digitizes reference signals as well as other signals from the encoder 200 with 10 bits of resolution to support digital signal processing. The DAC generates analog versions of digitally composed signals, including digital reference signals, for analog processing by the optical encoder 200. The timers process and accumulate pulses from the differential encoder 210 and measure time between signal events.

The microcontroller 215 is coupled to external RAM 217 and erasable programmable read only memory ("EPROM") 218. Field service personnel can outfit the transmitter 150 with new software by replacing an existing EPROM 218 with another EPROM 218 that holds upgraded firmware.

The microcontroller 215 can be coupled to or comprise various types of memory such as any one or combination of volatile memory elements (e.g., forms of RAM such as DRAM, SRAM, SDRAM, etc.) and nonvolatile memory elements (e.g., ROM, hard drive, tape, CDROM, etc.). Moreover, the microcontroller's memory may incorporate electronic, magnetic, optical, and/or other types of storage media and can have a distributed architecture, where various components are situated remote from one another, but can be accessed by the microcontroller's microprocessor or other computer of the microcontroller 215.

A "computer-readable medium" can be any means that can store, communicate, propagate, or transport a program for use by or in connection with an instruction execution system, apparatus, or device. The computer readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection (electronic) having one or more wires, a portable computer diskette (magnetic), a RAM (electronic), a read-only memory (ROM) (electronic), an erasable programmable read-only memory (EPROM, EEPROM, or Flash memory) (electronic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

The microcontroller 215 can also include logic implemented in hardware with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

A direct current ("DC") power supply 225 provides electrical power to the microcontroller 215 and other components of the transmitter 150. The DC power supply 225 is galvanically isolated from the electrical circuitry of the transmitter 150. That is, the electrical lines that feed electrical power from an external power source (not shown) to the DC power supply 225 do not share a common ground with the electrical lines that feed power from the DC power supply 225 to the electrical systems within the transmitter 150. In addition to suppressing noise, the power supply's isolation facilitates operating multiple transmitters 150 on a common power bus without incurring increased failure probability. If one transmitter on the power bus fails, for example due to an internal power fault or short-to-ground, the isolation helps prevent that failed transmitter from interfering with the operations of the other transmitters on the bus.

The communications interface 230 outputs level measurement signals to external devices such as feedback controllers 145, distributed control systems, and data networks. An optical isolator (not shown) couples the communications interface 230 to the microcontroller 215.

A configuration and diagnostics interface 235 provides user-friendly access to the transmitter 150 for installation and maintenance by field service personnel. The interface's diagnostic capabilities facilitate troubleshooting the transmitter 150 or an associated device such as a float 130 or a tape 175 in the field as may be required from time-to-time. A set of visible LEDs 236 provide a visible indication of the binary state of each the optical sensors (not shown in FIG. 2) within the encoder 200. A technician may use these LEDs 236 to verify proper encoding operation by manually changing the fluid level in the tank 120 and observing the changing pattern of LED illumination. The interface 235 can comprise an array of 16 LEDs 236, one for each bit in the encoder's 16-bit word that specifies absolute level. The interface can also comprise LEDs 236 for the encoder's reference optical sensors and the differential optical sensors discussed below.

The configuration and diagnostics interface 235 also comprises a RS-232 port 237 that provides a serial data link to diagnostic tools, hand held instruments, and various computing devices. During installation, a technician typically configures the transmitter's address, baud rate, and parity by setting dual inline pin ("DIP") switches 239 at the interface 235.

The transmitter 150 has two digital inputs 240 that can be connected to a level switch or other device that outputs a digital signal or closes a contact upon the occurrence of an event relevant to the tank's level or the transmitter's operation.

RTDs 190 that measure the temperature of the fluid 110 in the tank 120 connect to the transmitter 150 via an RTD interface 245. An associated electrical erasable programmable read only memory ("EEPROM") 247 stores calibration data for the RTDs 190.

Installing an optional module 250, in the form of a circuit board, in the transmitter 150 can expand the transmitter's functionality. The optional module 250 can comprise supplemental digital inputs and relay outputs 260 that open or close under control of software executing on the microcontroller 215. Using this capability, the transmitter 150 can implement level control of a tank 120 without needing an external controller 145 by opening or shutting the tank's feed valve 160. The optional module 250 can also comprise a supplemental power supply 255 to support alternating current ("AC") power requirements associated with expanded functionality.

Figure 3:
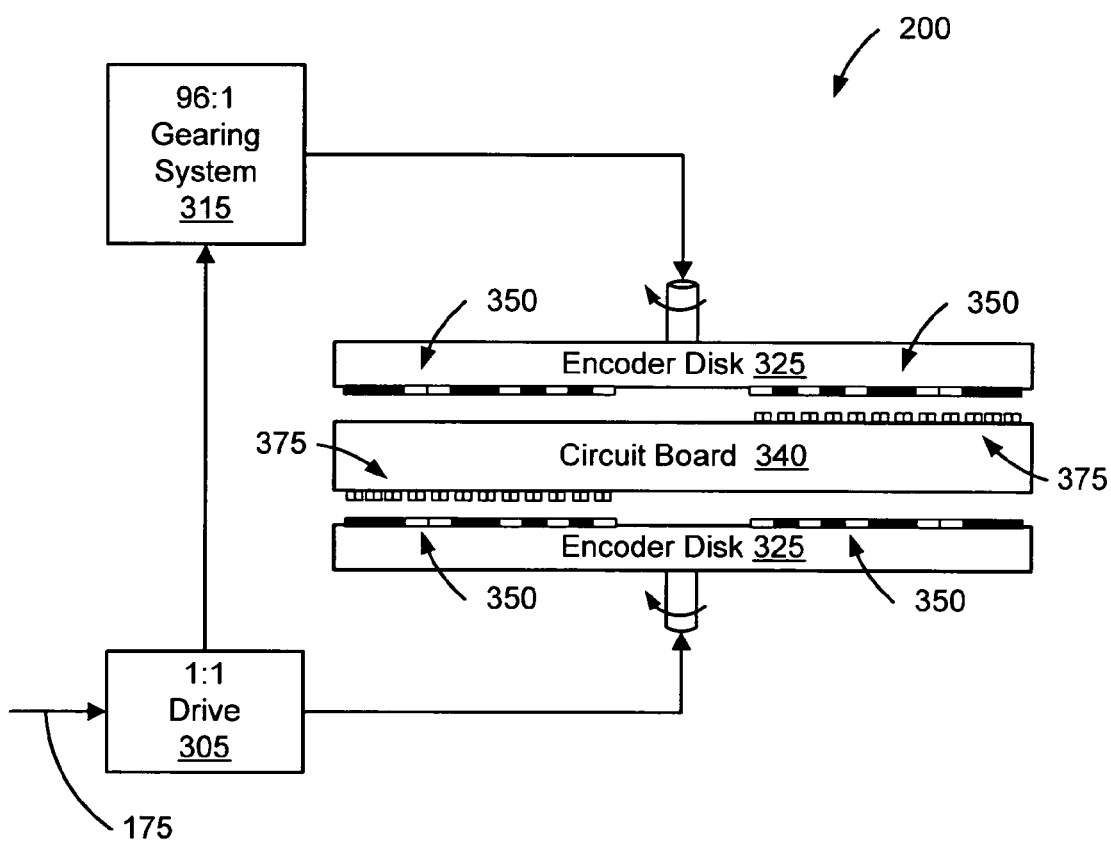
FIG. 3 is a schematic illustration of an exemplary optical encoder in accordance with an embodiment of the present invention.

Turning now to FIG. 3, this figure illustrates a schematic representation of an exemplary encoder 200 in accordance with an embodiment of the present invention. A drive mechanism 305 having a 1:1 ratio couples a rotatable encoder disk 325 to the tape-based linkage 175 that is connected to the float 130. The 1:1 drive 305 converts the linear tape motion that is associated with fluid level change into rotational motion that turns the encoder disk 325.

A 96:1 gearing system 315 provides corresponding but slower rotation to another encoder disk 325. Thus, the top encoder disk 325 synchronously rotates once for every 96 rotations of the bottom encoder disk 325. The disk rotations provided by these drive mechanisms 305 provide a coarse and a fine measurement of level that can correspond to feet and inch measurement units, for example.

These drive and gearing mechanisms 305, 315 can comprise any of the various drive components known to those skilled in the transmission arts. For example, a spring, stepper motor, or winding unit can take up any slack in the tape 175 associated with up or down motion of the float 130. The 1:1 drive 305 and the 96:1 gearing system 315 translate vertical float motion into smooth or uninterrupted disk rotation. In an alternate embodiment, a Geneva gearing system provides intermittent or stepwise disk rotation.

Each encoder disk 325 comprises a surface that is patterned with light and dark marks or patches that respectively reflect and absorb incident light, as will be discussed in further detail below. Each surface also comprises ten circular tracks 350 that are concentric about the disk's axis of rotation. Each of these tracks 350 is covered with an absorptive patch, a reflective patch, or a combination of reflective and absorptive patches.

A circuit board 340, disposed between the two encoder disks 325 has two arrays of optical sensors 375, one facing and directed to each encoder disk 325. That is, the circuit board 340 is two-sided with optical sensors 375 on each side. Each optical sensor 375 is directed to one of the tracks 350, emits infrared light onto the track 350, and detects light that is reflected back from the track 350. If the disk 325 is in a rotational position that places a reflective area of a track 350 in an individual sensor's measurement zone or field-of-view, that sensor 375 outputs a relatively intense electrical signal. On the other hand, rotating the disk 325 to place an absorptive patch into the sensor's measurement zone yields a relatively weak electrical signal.

Based on the relative intensities of the signals acquired from these optical sensors 375, the encoder 200 can categorize each sensor output in a binary or digital manner. Each bit in a multi-bit word can refer to the high-verses-low signal state of a specific sensor 375. Binary one or digital one can indicate that the disk 325 is rotated so that a reflective patch is positioned in a specific sensor's field-of-view or measurement zone. Conversely, having a specific bit in the multi-bit word set to binary zero or digital zero can specify that the disk 325 is in a rotational position that places an absorptive patch in front of a specific sensor 375.

Figure 4:
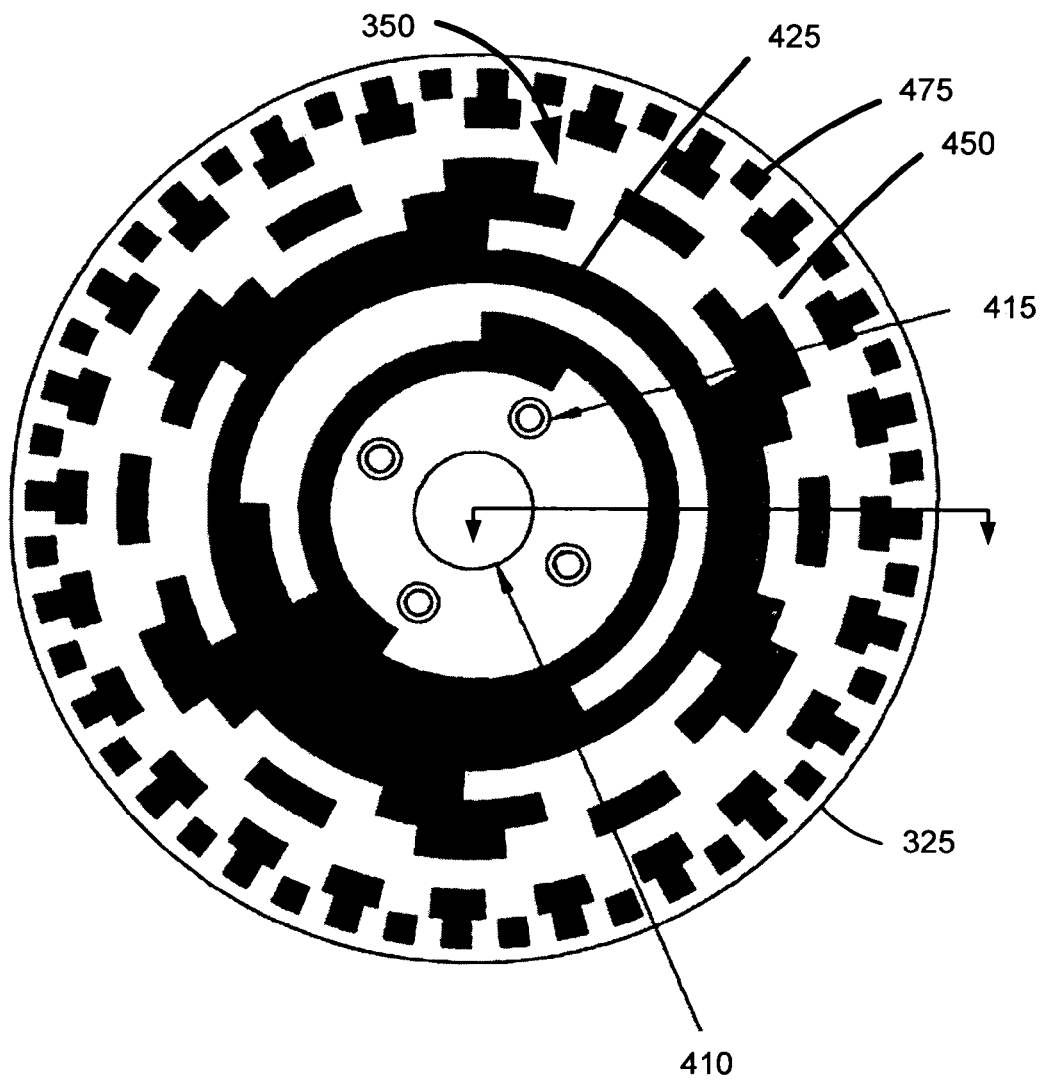
FIG. 4 is an illustration of an exemplary optical encoder disk patterned with reflective and absorptive patches in accordance with an embodiment of the present invention.

Turning now to FIG. 4, this figure illustrates an exemplary optical encoder disk 325 that has a pattern of reflective and absorptive patches in accordance with an embodiment of the present invention. Each of the sensors 375 that is illustrated in FIG. 3 is proximate to and optical coupled with one of the tracks 350 illustrated in FIG. 4. Each sensor 375 is positioned to track or follow a circular path around the disk 325 as the disk 325 rotates and the sensor array 375 remains stationary. The paths of the data sensors 375 in the array 375 that optically acquire disk rotation measurements traverse a pattern of reflective and absorptive patches. The illustrated pattern, which is applied to the sensor tracks 350, supports deducing the rotational position of the disk 325 based on the pattern of digital ones and digital zeros in the multi-bit word that specifies the output state of each optical sensor 375.

The encoder disk 325 comprises ten tracks 350 that are concentric about a center hole 410, which is surrounded by four fastening holes 415. The tracks 350 include absolute measurement data tracks, reference tracks 425, 450, and a differential measurement data track 475. The outermost track, track ten 475, provides both differential measurement data and absolute measurement data, as will be discussed in more detail below. With the exception of the two reference tracks 425, 450 the light and dark patches of the track patterns have progressively smaller size towards the outside of the disk 325. The fourth track 425, counting from the center outward, is fully dark and thus uniformly absorptive. Thus, track four 425 yields a reference signal indicative of the signals generated by the absorptive patches in the data tracks. Likewise, the uniformly light or reflective surface of the eighth track 450 provides a reference signal that corresponds to the signals generated by the reflective patches in the data tracks.

Figure 5:
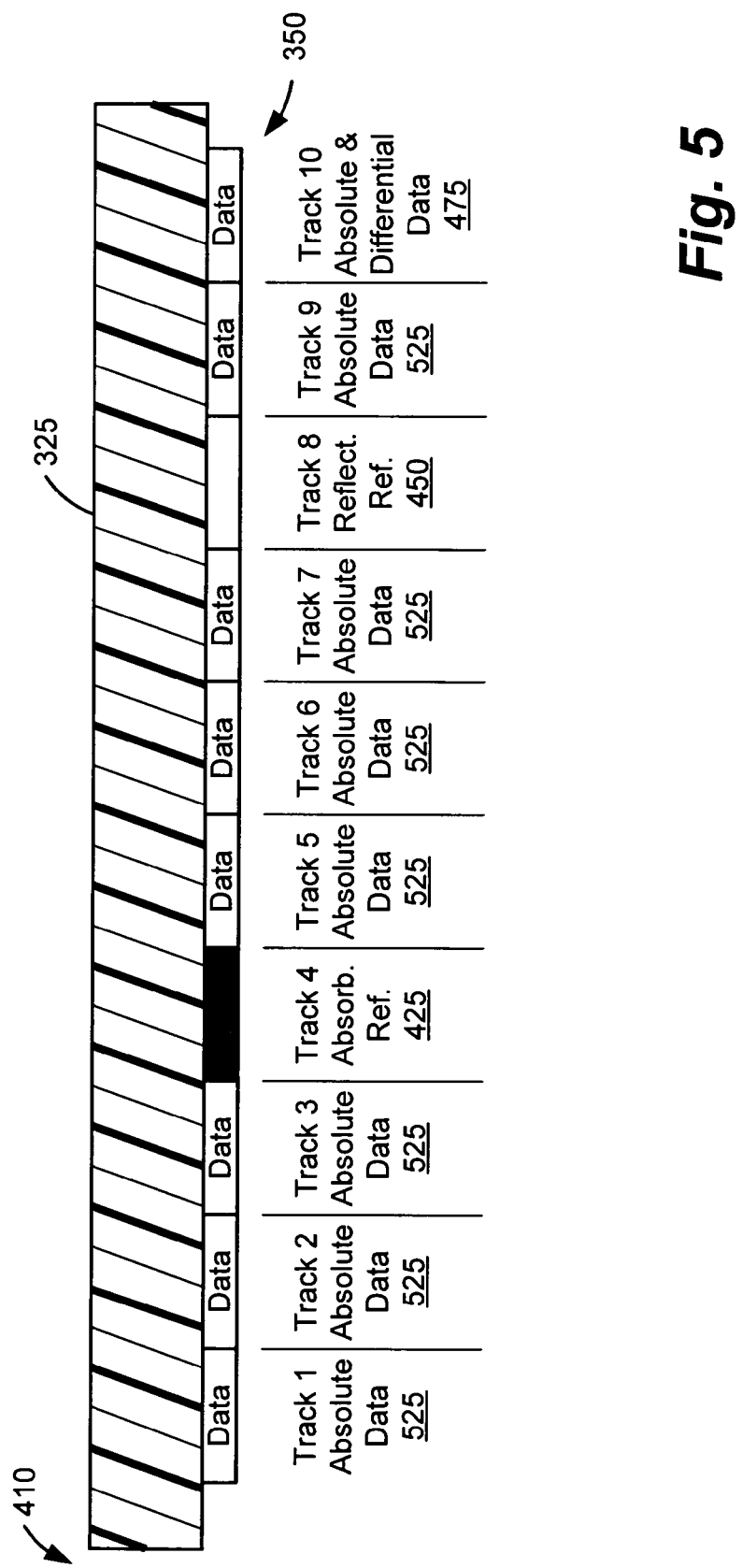
FIG. 5 is an illustration of exemplary data and reference tracks of an optical encoder disk in accordance with an embodiment of the present invention.

Turning now to FIG. 5, this figure illustrates an exemplary cross section view of the optical encoder disk 325 of FIG. 4 taken along the indicated view line. To convey the functionalities of each of the tracks 350, FIG. 5 shows the patches of the data tracks 525, 475 using the designation "Data" rather than with the light or dark shade shown in FIG. 4. The thickness of the tracks 350 has been exaggerated for illustrative purposes.

Whereas a single optical sensor 375 (not shown in FIG. 5) is positioned over each of tracks one through nine 525, 425, 450, three sensors 375 (not shown in FIG. 5) are dedicated to data track ten 475. One of the track-ten sensors 375 provides absolute encoding data, while the two other track-ten sensors provide differential encoding data, as discussed in more detail below.

The encoder disk 325 can be fabricated from standard circuit board stock such as the material commonly known in the industry as "FR4." The dark patches can be a film of solder mask material applied to the circuit board. The reflective patches can be a copper film, attached using a typical plating process for applying circuit traces to circuit boards, overlaid with a thin coat of gold.

The encoder disk 325 can also be fabricated from various rigid materials such as metal, plastic, resin, ceramic, or phenolic composites. The reflective patches can be diffusely reflective or specularly reflective films applied to a substrate composed of such material. For example, the reflective patches can comprise a coat of low-gloss white paint or similar film or alternatively can have a mirror finish. The absorptive patches can be ink, black paint, or another film that absorbs, attenuates, or diverts incident light or otherwise suppresses the amount of light that returns to the optical sensor 375.

Figure 6B:
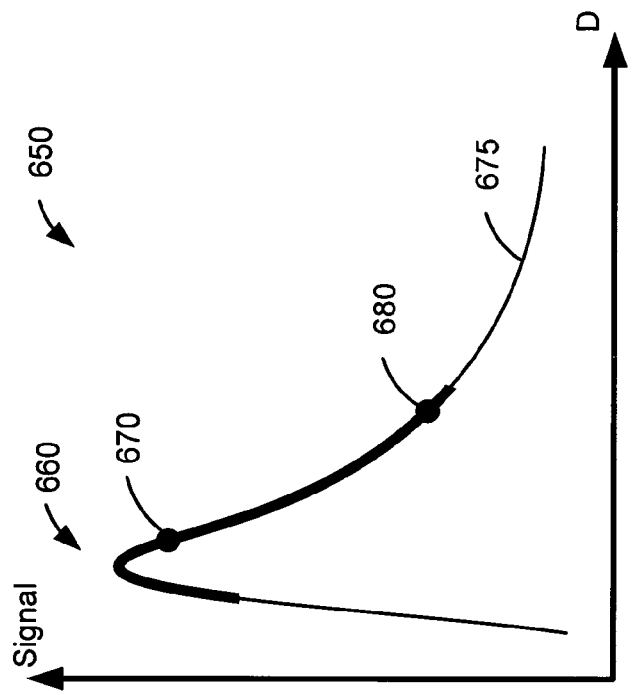
FIG. 6B is a representative plot of signal amplitude verses separation distance between the reflective patch and the optical sensor illustrated in FIG. 6A.
Figure 6A:
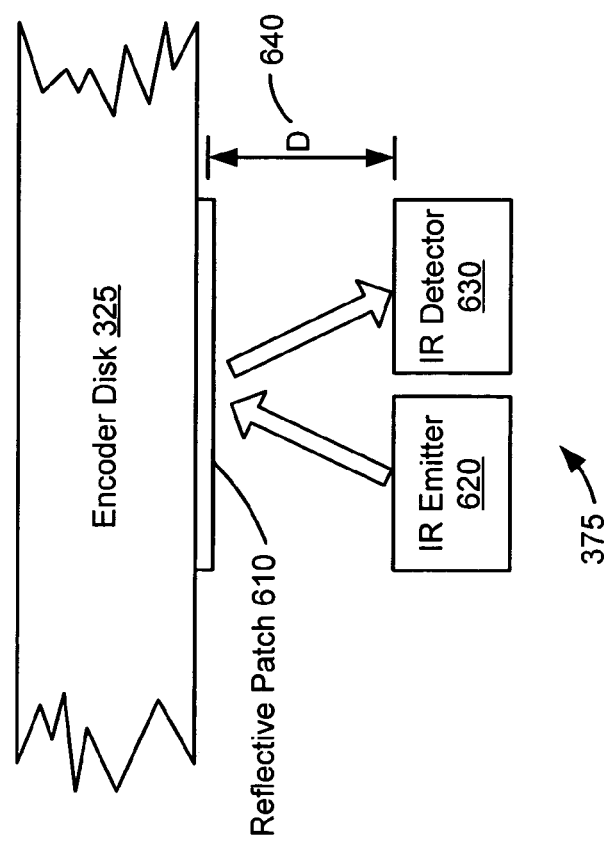
FIG. 6A is an illustration of an encoding optical sensor positioned a distance from a reflective patch on an optical encoder disk in accordance with an exemplary embodiment of the present invention.
Figure 7:
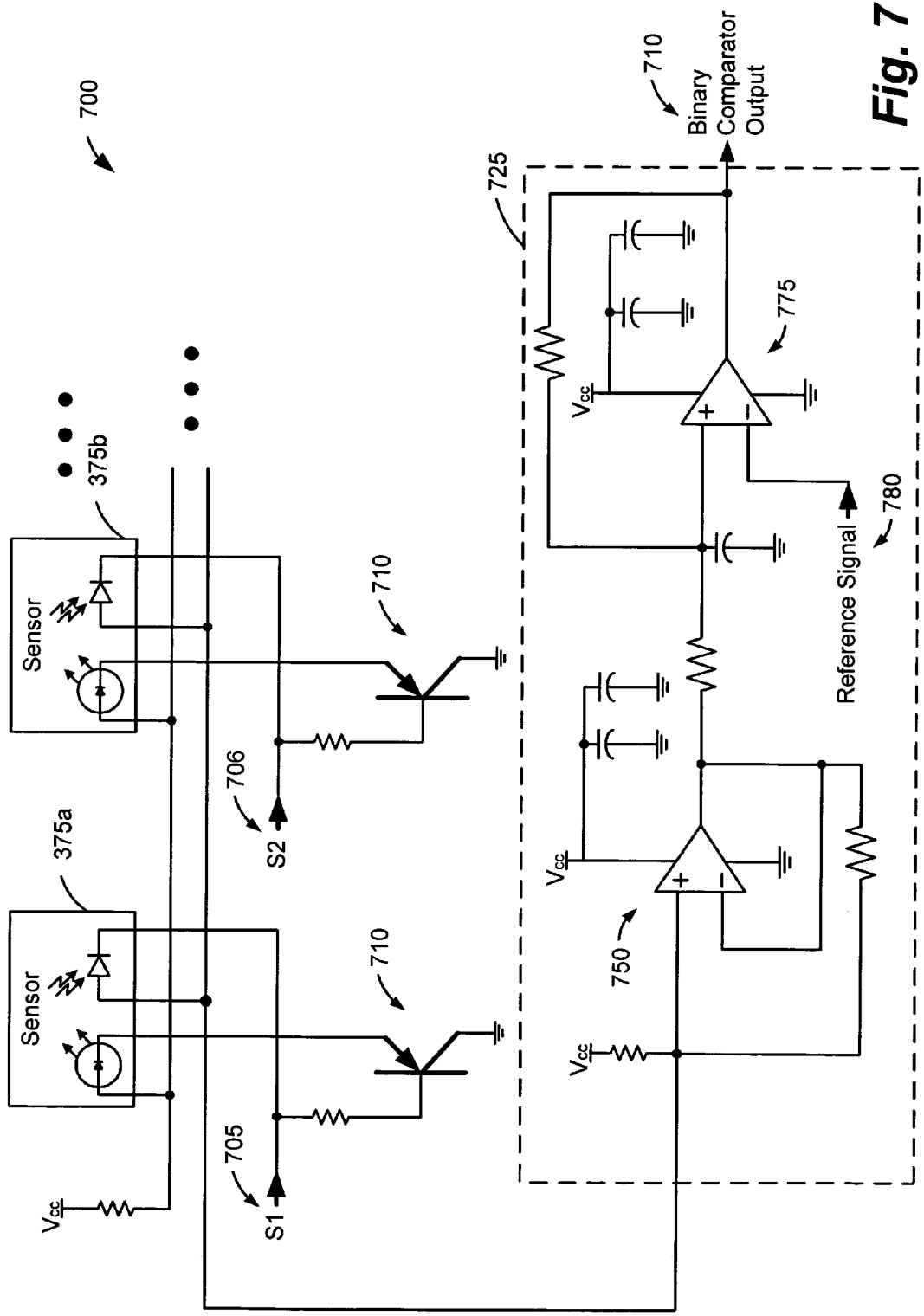
FIG. 7 is a schematic view of an exemplary absolute encoder circuit in accordance with an embodiment of the present invention.

Referring now to FIGS. 6A and 6B, FIG. 6A illustrates an encoding optical sensor 375 positioned a distance from a reflective patch 610 on the optical encoder disk 325 in accordance with an exemplary embodiment of the present invention. Meanwhile, FIG. 6B presents a representative plot 605 of signal amplitude verses separation distance 640 between the reflective patch 610 and the optical sensor 375.

The optical sensor comprises a infrared ("IR") emitter 620, such as an IR LED, that emits light into a field-of-view or sensing zone and an IR detector 630 that receives light from the sensing zone. The detector 630, which is typically a phototransistor but can be a photodiode or similar optoelectronic element, produces an electrical signal with an intensity that is related to the level of light received. Fairchild Semiconductor Corporation of South Portland, Me. supplies suitable optical sensors under the designation QRE1113.GR Reflective Object Sensor.

As illustrated by the plot 650, the strength of the sensor's signal output is distance dependent. The peak and surrounding bolded line 660 of the response curve 675 indicates generally acceptable operating regions. If the sensor 375 is placed too close to or too far away from the encoder disk 325, the detector 630 will receive an inadequate level of light from the reflective patches 610, resulting in insufficient signal level. Further, such reduced signal amplitude can complicate distinguishing light patches from dark patches. Thus, the regions 660 of acceptable performance provide a guide for establishing manufacturing tolerances.

A similarly shaped but significantly attenuated plot (not shown) can be generated by moving an absorptive patch through the sensor's field-of-view. If the signal generated by the reflective patch is too weak, the encoder 200 may not adequately distinguish between reflective and absorptive patches. That is, the difference between the signal strength of the reflective patches 610 and the signal strength of the absorptive patches should clearly distinguish these patches from one another. Thus, the assembly process for manufacturing the encoders 200 should position the encoder disk 325 at a standoff distance 640 from the sensor array 375 that adequately separates the reflective response curve 660 from the absorptive response curve (not shown).

As the transmitter 150 ages and the optical surfaces and other components degrade, the operating point on the reflective response curve 675 can be expected to shift, for example moving from an initial position of point 670 to a point 680. Described from another perspective, aging can cause amplitude suppression of the reflective response curve 675. Thus, the difference between the reflective-patch signals and the absorptive-patch signals can become less pronounced as a result of hardware aging. Referencing the sensors 375 to the reference signal tracks 425, 450 can help compensate for such aging effects to maintain an acceptable level of signal fidelity and encoding performance.

Turning now to FIG. 7, this figure illustrates a schematic view of an exemplary absolute encoding circuit 700 in accordance with an embodiment of the present invention. The circuit 700 comprises the eight optical sensors 375 that are coupled to the absolute encoding data tracks 525, 475 with the figure explicitly illustrating two sensors 375a, 375b. That is, the circuit 700 includes six optical sensors 375 that are not illustrated but that are connected in parallel with the two illustrated sensors 375a, 375b.

The microcontroller 215 outputs signals (S1 705, S2 706 . . . ) that separately activate each sensor 375 in a software-defined sequence. The sequence can step from the innermost data track, track one 525, to the outermost track, track ten 475. In a step of this sequence, the signal S1 705 activates sensor 375a by allowing current to flow through transistor 710. The resulting current also flows through the emitter section of the sensor 375a, which is connected to the transistor 710 in a series arrangement. Thus, the flowing current produces light emission from the optical sensor 375a onto the encoder disk 325.

Light emanating from the encoder disk 325 returns to the sensor 375a and generates a corresponding current flow out of the sensor 375a to a comparator circuit 725. The first amplifying stage 750 of the comparator circuit 725 buffers and amplifies the sensor output signal in preparation for processing by the second stage as a voltage input. The second stage comprises a comparator 775 that compares the conditioned sensor signal from the first-stage amplifier 750 to the reference signal 380 output by the microcontroller's DAC. As discussed elsewhere herein, an algorithm executing on the microcontroller 215 constructs a digital representation of the reference signal 780 based on the outputs of the respective sensors 375 coupled to reference track four 425 and reference track eight 450.

Texas Instruments Incorporated of Dallas, Tex. supplies suitable amplifiers for the first-stage amplifier 750 under the designation OPA4342 Low Power, Rail-to-Rail, Operational Amplifier. Texas Instruments also supplies suitable comparators for the second-stage comparator 775 under the designation TLV2704 Push-Pull Comparator.

Applying the reference signal 780 as a threshold, second-stage comparator 775 discretely categories the buffered signal as either resulting from a reflective patch 610 or an absorptive patch positioned in the sensor's field-of-view. The comparator 775 outputs a high signal, representing digital one, to indicate the presence of a reflective patch 610 and a low signal, representing digital zero, to indicate the presence of an absorptive patch. Thus, the binary state of the comparator output 710 specifies the rotational position of the encoder disk 325 with a level of precision that corresponds to the fraction of the total track circumference that is covered by each patch.

The circuit 700 cycles through each of the absolute data tracks 525 and acquires a rotational disk position in the form of a bit 710 from each of the respective absolute data track sensors 375. The microcontroller 215 assembles the bits from each of the two encoder disks 325 into an 8-bit word to provide a combined 16-bit word that specifies the rotational positions of both disks 325. The microcontroller 215 references the 16-bit word to a lookup table stored in memory to determine the absolute fluid level of the tank 120.

Figure 8A:
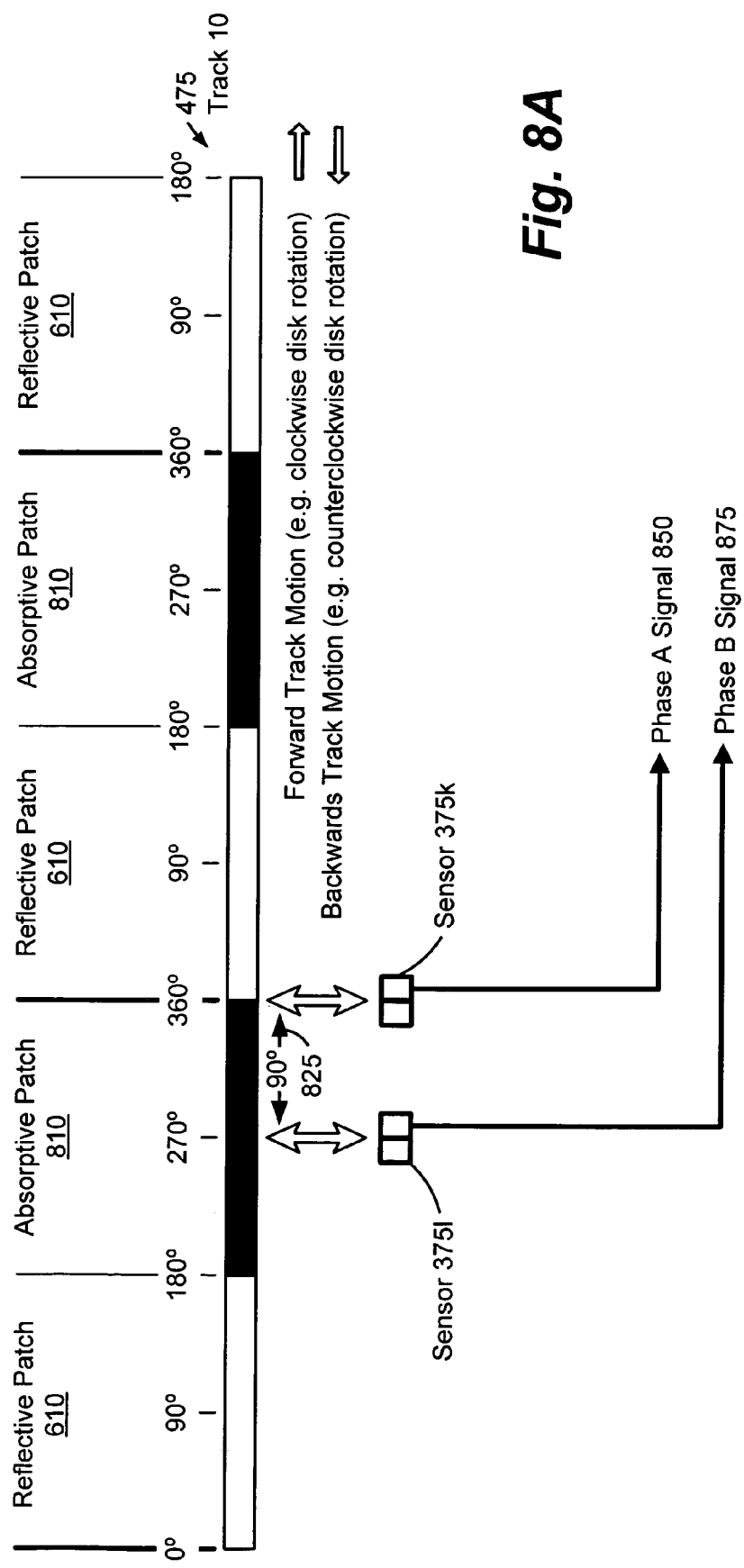
FIG. 8A is an illustration of two differential optical encoder sensors reading a data track of an optical encoder disk and displaced from one another by one-fourth of the data track's pattern cycle in accordance with an exemplary embodiment of the present invention.

Turning now to FIGS. 8A and 8B, an exemplary embodiment of the differential encoder 210 of the optical encoder 200 will now be described. FIG. 8A illustrates two differential optical encoder sensors 375k, 375l reading a data track 475 of an optical encoder disk 325 and displaced from one another by one-fourth of the data track's pattern cycle 825 in accordance with an exemplary embodiment of the present invention. FIG. 8B illustrates the relative timing of representative signal outputs 850, 875 of the sensors 375k, 375l of FIG. 8A resulting from rotating the encoder disk 325 clockwise and counterclockwise in accordance with an exemplary embodiment of the present invention.

Two optical sensors 375k, 375l are positioned to face and collect data from track ten 475. This track 475 comprises a repeating pattern or cycle of reflective and absorptive patches 610, 810. One full cycle comprises a reflective patch 610 and an adjacent absorptive patch 810. That cycle can be mathematically characterized as having 360°, as will be understood to those skilled in the mathematics, the electrical, or the signal processing arts.

The optical sensors 375k, 375l are separated from one another along track ten 475 by approximately one-fourth of a pattern cycle 825. Explained another way, sensor 375k is displaced from sensor 375l by 90° of phase separation 825.

Sensor 375k generates a signal 850 denoted "phase A signal" in FIGS. 8A and 8B, while sensor 375l outputs a signal 875 denoted "phase B signal." At an arbitrary point in time, the amplitudes of each of these signals 850, 875 correspond to the reflectivity (absorptive verses reflective) of the patches 610, 810 that are in their respective fields-of-view.

As the fluid level changes, the encoder disk 325 rotates. As the encoder disk 325 rotates, data track ten 475 moves in front of sensor 375k and sensor 375l and presents each of these sensors 375k, 375l with a series of absorptive and reflective patches 610, 810. Each of sensor 375k and sensor 375l outputs a signal 850, 875 with a time-varying amplitude. The time-varying signal amplitudes track and are synchronized with the reflectivity (absorptive/dark verses reflective/light) of the patches 610, 810 that are moving into and out of each sensor's respective field-of-view.

Because each sensor 375k, 375l views the same data track 475 and is presented with the same patch pattern, the forms or shapes of the phase A signal 850 and the phase B signal 875 are essentially the same. However, since there is a 90° phase separation 825 between the sensors 375k, 375l, the two signals 850, 875 are out of synchronization with one another by 90° 825. That is, as the encoder disk 325 rotates, patches 610, 810 move into the field-of-view of one of the sensors 375k, 375l before the other sensor. Thus, one of the sensor signals 850, 875 transitions from low amplitude to high amplitude earlier than the other.

If the track 475 is moving in the forward direction, according to the illustrated, arbitrarily-assigned directional convention, the phase A signal 850 from sensor 375k leads or occurs earlier in time than the phase B signal 875 from sensor 375l. Conversely, reverse motion causes the phase B signal 875 to lead the phase A signal 850 in time. Thus, the direction of encoder disk rotation (clockwise verses counterclockwise) corresponds to the relative timing (leading verses lagging) between the phase signal A 850 and the phase B signal 875.

While the amount of time that one of the signals 850, 875 leads the other depends upon the speed of disk rotation, the signal phase shift 825 is 90° regardless of rotational speed. If signal 850 leads signal 875 by 90° 825 (or another phase shift as defined by the physical separation between the sensors 375k, 375l) the tank level can be known to be changing in a predetermined direction, for example rising. Conversely, signal 875 leading signal 850 can indicate falling tank level.

The number of signal cycles that occur during a time period determines the amount of level change that has occurred during this time. The microcontroller 215 uses its timer to clock the time period. With support from signal processing circuitry, the microcontroller 215 counts signal cycles during this time period using "leading edge" signal transitions between low signal amplitude and high signal amplitude as the trigger for each counting increment.

If the differential encoder 210 has determined that the fluid level is rising, the microcontroller 215 adds the computed level change to a previous absolute level measurement from the absolute encoder 205. In the case of falling level, the microcontroller 215 subtracts the computed level change from an absolute level measurement. The microcontroller 215 continues accumulating change onto the baseline measurement until a new absolute measurement is available from the absolute encoder 205 to use as a fresh baseline.

Figure 9:
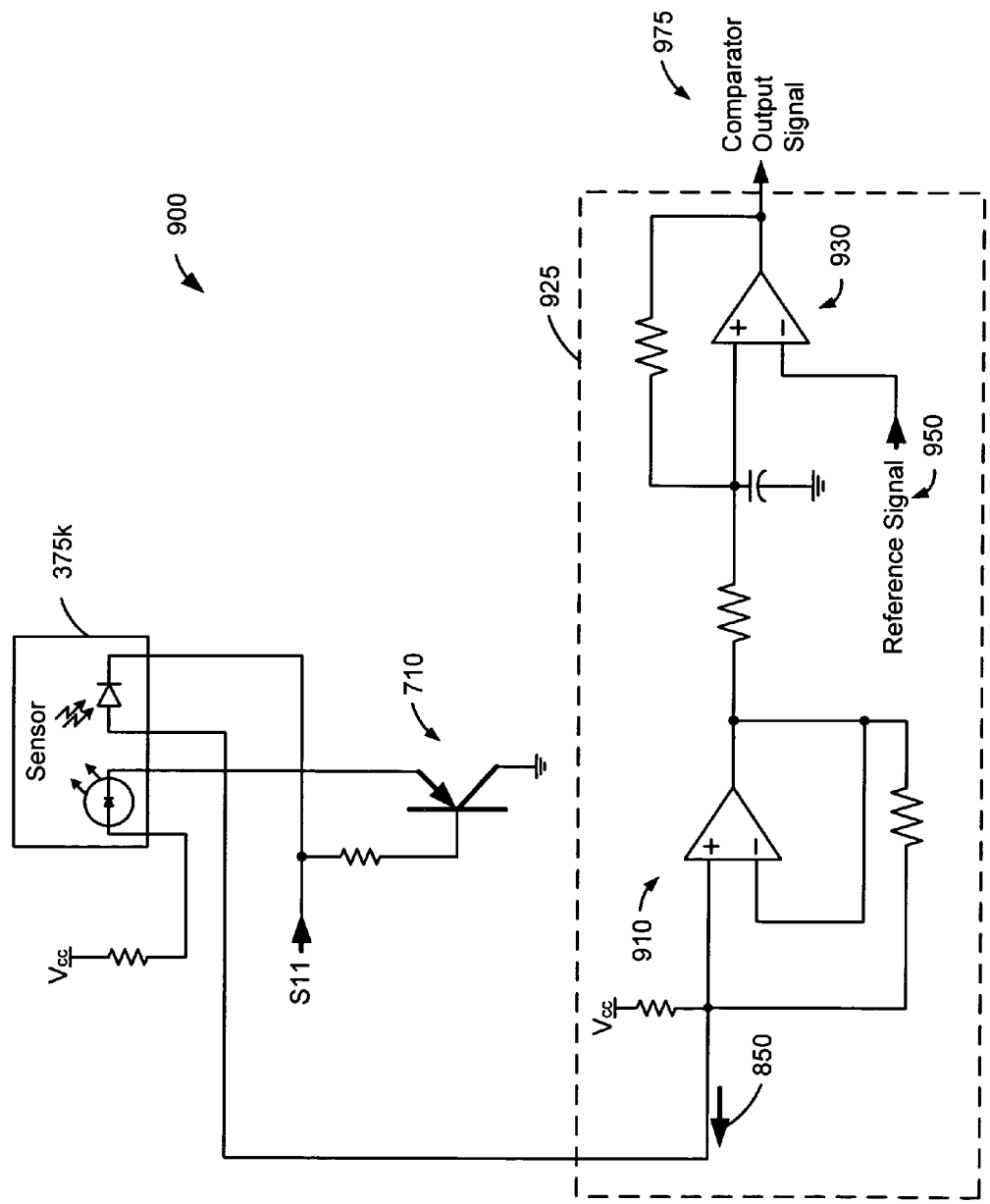
FIG. 9 is a schematic view of an exemplary differential encoder circuit in accordance with an embodiment of the present invention.

Turning now to FIG. 9, this figure illustrates a schematic view of an exemplary differential encoding circuit 900 in accordance with an embodiment of the present invention. The differential encoder 210 comprises two circuits 900 fabricated according to this schematic, one for the phase-A differential encoder sensor 375k (as illustrated) and one for the phase-B differential encoder sensor 375l (not shown in FIG. 9).

The microcontroller 215 outputs signal S11 905 to activate the sensor 375k. When the sensor 375 is active, it generates a current signal 850 having an amplitude corresponding to its level of received light. Thus, the current 850 tracks the pattern of light and dark patches 610, 810 passing into and out of the sensor's field-of-view.

The first stage 910 of the comparator circuit 925 amplifies the current 850 and outputs a voltage signal. Texas Instruments supplies suitable amplifiers for the first-stage amplifier 910 under the designation OPA4342 Low Power, Rail-to-Rail, Operational Amplifier.

A comparator 930 compares the amplified voltage signal from the first stage 910 to a reference signal 950. Texas Instruments also supplies suitable comparators for the second-stage comparator 775 under the designation TLV2704 Push-Pull Comparator.

As discussed elsewhere herein in further detail, an algorithm executing on the microcontroller 211 generates a digital version of the reference signal based on reference signals acquired from reference tracks four and eight 425, 450. The microcontroller's DAC converts the digital signal into the analog domain for use by the comparator 930.

The reference signal 950 used by the differential comparator circuit 925 can be essentially the same reference signal as the reference signal 780 used by the absolute encoding comparator circuit 725. Alternatively, these reference signals 950, 780 can be distinct from one another.

In one exemplary embodiment of the present invention, the microcontroller 215 comprises a first DAC channel providing an analog reference signal 780 for the absolute encoder 205 and a second DAC channel providing an analog reference signal 950 for the differential encoder 210. Having a DAC channel dedicated to outputting the reference signal 950 for the differential encoder comparator 930 enhances the stability of that reference signal 950 and avoids signal variations that could compromise differential encoding performance.

The comparator 930 makes a comparison between the reference signal 950 and the sensor output and accordingly assumes one of two discrete states. The comparator 930 outputs a digital one or a digital zero depending on whether the buffered sensor output is greater or less than the reference signal 950.

The microcontroller 215 receives and processes the comparator output signal 975 from the phase A sensor 375k, along with the comparator output signal (not illustrated) from the phase B sensor 375l. This processing counts pulses and determines whether the fluid level is increasing or decreasing.

Processes of an exemplary embodiment of the present invention will now be described in reference to the flowcharts illustrated in FIGS. 10–14 and various exemplary elements illustrated in FIGS. 1–9 and discussed above. The present invention can include multiple computer programs which embody the functions described herein and illustrated in the exemplary figures. However, it should be apparent that there could be many different ways of implementing the invention in computer programming, and the invention should not be construed as limited to any one set of computer program instructions. Further, a skilled programmer would be able to write such a computer program to implement the disclosed invention without difficulty based on the exemplary data tables and flow charts and associated description in the application text, for example.

Therefore, disclosure of a particular set of program code instructions is not considered necessary for an adequate understanding of how to make and use the invention. The inventive functionality of any claimed computer programs will be explained in more detail in the following description in conjunction with the remaining figures illustrating the functions and program flow.

Certain steps in the processes described below must naturally precede others for the present invention to function as described. However, the present invention is not limited to the order of the steps described if such order or sequence does not alter the functionality of the present invention. That is, it is recognized that some steps may be performed before or after other steps or in parallel with other steps without departing from the scope and spirit of the present invention.

Figure 10:
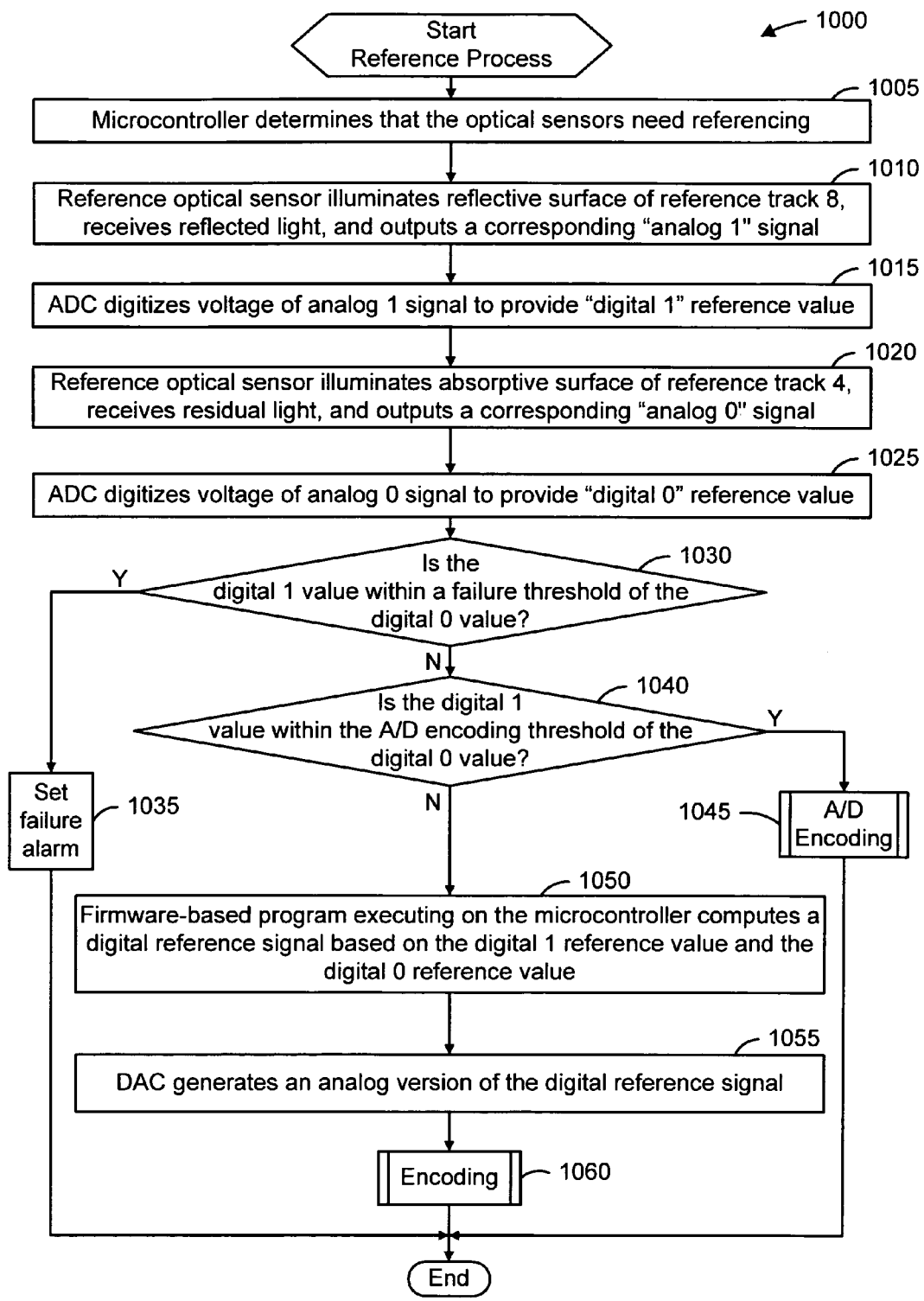
FIG. 10 is a flowchart illustrating an exemplary process for referencing optical encoder sensors in accordance with an embodiment of the present invention.

Turning now to FIG. 10, this figure illustrates a flowchart of an exemplary process 1000, entitled Reference, for referencing optical encoder sensors 375 in accordance with an embodiment of the present invention. At Step 1005, the first step in Process 1000, software executing on the microcontroller's microprocessor makes a determination that the optical data sensors 375 should be referenced. The software, which is typically stored in firmware, typically makes this determination and initiates a signal referencing cycle every 256 sensor reads. However, referencing can begin on a time basis or by monitoring signal quality. For example, the presence of noisy or erratic data can trigger the microcontroller 215 to reference the absolute and differential encoder sensors 375a, 375b, 375k, 375l.

At Step 1010, the microcontroller 215 sends an enable signal to the optical sensor 375 that faces track eight 450, the reflective reference track, and thereby activates that sensor 375. The sensor 375 emits light onto the surface of track eight 450, receives a level of light emanating from the track surface, and outputs a current signal. The amplitude of the current signal relates to the reflectivity of the reference track 450, which is similar to the reflectivities of the reflective patches 610 on the data tracks 525, 475. Aging effects typically degrade the reference track's surface and the reflective data patches 610 similarly. Thus, the acquired reference signal provides an "analog one" signal with an amplitude that is representative of the analog signals from the differential and absolute sensors 375a, 375b, 375k, 375l.

At Step 1015, the ADC generates a digital representation of this analog one reference signal to provide a "digital one" reference value. That is, the microcontroller's ADC outputs one or more numbers that specify the amplitude of the signal acquired from the reflective reference track 450. The microcontroller 215 typically acquires approximately five such digitized signals, averages the readings, and stores the result in memory.

At Step 1020, the microcontroller 215 enables the optical sensor 375 that is coupled to the absorptive reference track 425. The sensor 375 emits light on this track 425 and collects any reflected light that is not suppressed by the track's absorptive surface. This reference sensor 375 outputs an "analog zero" with an amplitude that is similar to and representative of the amplitudes of the data signals collected from the absorptive data patches 810 on the data tracks 525, 475.

At Step 1025, the ADC converts the signal into the digital domain approximately five times and computes an average that it stores in memory as a "digital zero" reference value.

At inquiry Step 1030, the microcontroller 215 determines whether the digital one value is within a threshold of the digital zero value. If these values are too close together, for example due to extreme contamination on the surface of the encoder disk 325, the encoder 200 may fail to generate acceptable encoding data. If the values are within the applied threshold, the microcontroller 215 sets a failure alarm at Step 1035, which the transmitter 150 can display locally on the diagnostics interface 235 and transmit to a networked computer system. Process 1000 ends following Step 1035.

Figure 11:
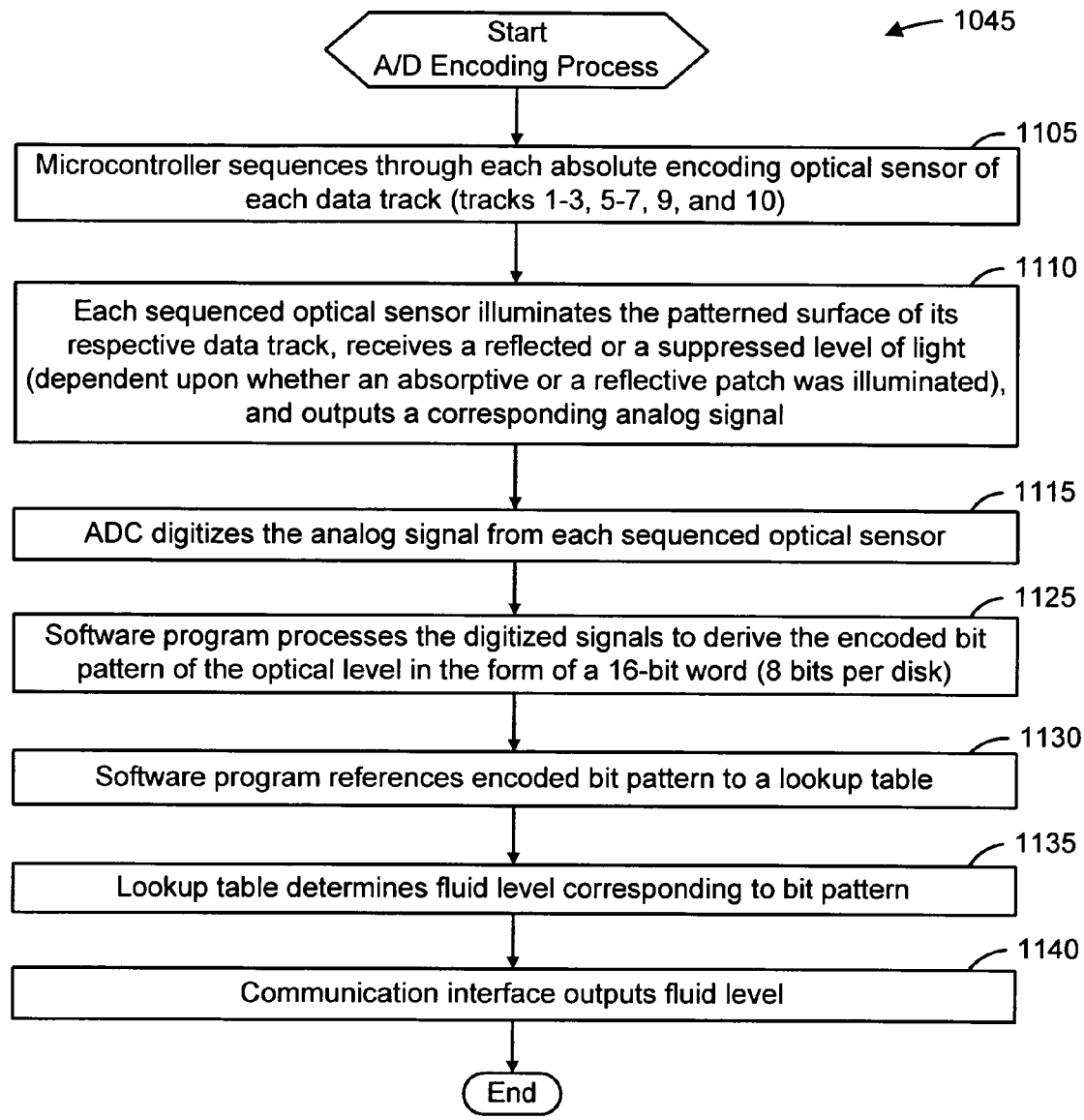
FIG. 11 is a flowchart illustrating an exemplary process for determining fluid level based on converting analog encoder signals into the digital domain in accordance with an embodiment of the present invention.

If the digital one reference value and the digital zero reference value are not within the failure threshold, at inquiry Step 1040, the microcontroller 215 determines whether these digital reference values are within a second threshold of one another. If these values are within the second threshold, the microcontroller 215 effectively anticipates that the absolute encoder 205 and differential encoder 210 may provide unacceptable encoder performance. In this case, the microcontroller 215 initiates execution of the Analog-to-Digital ("A/D") Encoding process 1045 that FIG. 11 illustrates in flowchart form as discussed below. Following Step 1045, Process 1000 ends.

If the digital one reference value and the digital zero reference value are not within the A/D encoding threshold of one another, Process 1000 proceeds and executes Step 1050. At Step 1050, the microcontroller 215 executes an algorithm to compute a digital reference signal based on the digital one reference value and the digital zero reference value. One such exemplary algorithm averages the digital one reference value and the digital zero reference value then multiplies the resulting average by a scaling factor that provides a signal margin. Such a scaling factor can be determined empirically and can be 1.1, for example.

At Step 1055, the microcontroller's DAC generates an analog voltage signal based on the digital reference signal resulting from the computations of Step 1050. The microcontroller 215 can use two DAC channels for this conversion to provide one reference signal 780 for the absolute comparator circuit 725 and one reference signal 950 for the differential comparator circuit 925.

At Step 1060, which is discussed below with reference to FIG. 12, the microcontroller 215 initiates absolute or differential encoding using the reference signals 725, 950. Following Step 1060, Process 1000 ends.

Turning now to FIG. 11, this figure illustrates a flowchart of an exemplary process 1045, entitled A/D Encoding, for determining fluid level based on converting analog encoding signals into the digital domain in accordance with an embodiment of the present invention. Process 1000 initiates execution of the A/D Encoding process 1045 at Step 1045 when the amplitudes of the signals collected from the reflective reference track 450 and the absorptive reflective reference track 425 are not sufficiently separated from one another to ensure a reliable level of absolute encoding following the steps of Process 1235 discussed below or differential encoding performance. Thus, A/D Encoding 1045 provides the transmitter 150 with a level of encoding redundancy.

At Step 1105, software executing on the microcontroller 215 sequences though each of the absolute encoding optical sensors 375, two of which FIG. 7 illustrates as sensor 375a and sensor 375b. The software triggers issuance of an activation signal 705, 706 for each sequenced sensor 375 as discussed above in reference to FIG. 7. The absolute data sensors 375 are coupled to the data tracks 525, 475 (data tracks 1–3, 5–7, 9, and 10). The microcontroller 215 enables each sensor 375 with an activation signal 705, 706.

At Step 1110, each sequenced sensor 375 illuminates its respective data track 525, 475 in response to the activation signal 705, 706. Each sequenced sensor 375 collects a level of light that is indicative of the type of patch in its field-of-view and generates an analog electrical signal having a corresponding amplitude.

At Step 1115, the microcontroller's ADC digitizes the respective analog signal from each data track 525, 475. The microcontroller digitally reads each data track 525, 475 approximately five times.

At Step 1125, an algorithm executing on the microcontroller 215 digitally or statistically processes the digital sensor data acquired at Step 1115 to generate a bit for each data track 525, 475. The microcontroller 215 constructs a 16-bit word from these bits.

While the digital signal processing ("DSP") algorithm may not provide the measurement speed of absolute and differential encoding techniques in certain embodiments, it can provide robust performance and compensate for many hardware problems. An exemplary algorithm for implementing Step 1125 proceeds according to the following steps.

1. Compute a mean of all of the data samples by averaging together each of the five readings from each of the ten absolute data sensors.
2. Divide the acquired data samples into two sets, a "high set" for the data samples that are greater than the average and a "low set" for the data samples that are less than the average.
3. Compute a mean of the high set, the "high mean."
4. Compute a mean of the low set, the "low mean."
5. Classify each acquired data sample that is greater than the high mean as a digital one, indicating that it was acquired from a reflective patch 610.
6. Classify each acquired data sample that is less than the low mean as a digital zero, indicating that it was acquired from an absorptive patch 810.
7. Classify each acquired data sample that is between the high mean and the low mean as indeterminate, neither a digital one nor a digital zero. Save the indeterminate data samples for potential classification in future iterations according to Step 8.
8. Continue acquiring data and classifying according to Steps 1–7, adding the new data to the earlier data in a moving-average manner that progressively refines and learns with each new data acquisition.

At Step 1130, the microcontroller 215 compares the 16-bit word to a lookup data. As discussed above, a lookup table can comprise a memory-resident matrix of 16-bit words and corresponding fluid levels. When provided a specific encoder code, in the form of a 16-bit word, the lookup table can return a corresponding fluid level measurement based on matching the code to the fluid level.

At Step 1135, the lookup table returns a fluid level measurement based on the 16-bit word. At Step 1140, the microcontroller 215 sends the level measurement to the communications interface 230, which transmits it to the feedback controller 145 or another device. Following Step 1140, Process 1045 ends.

Figure 12:
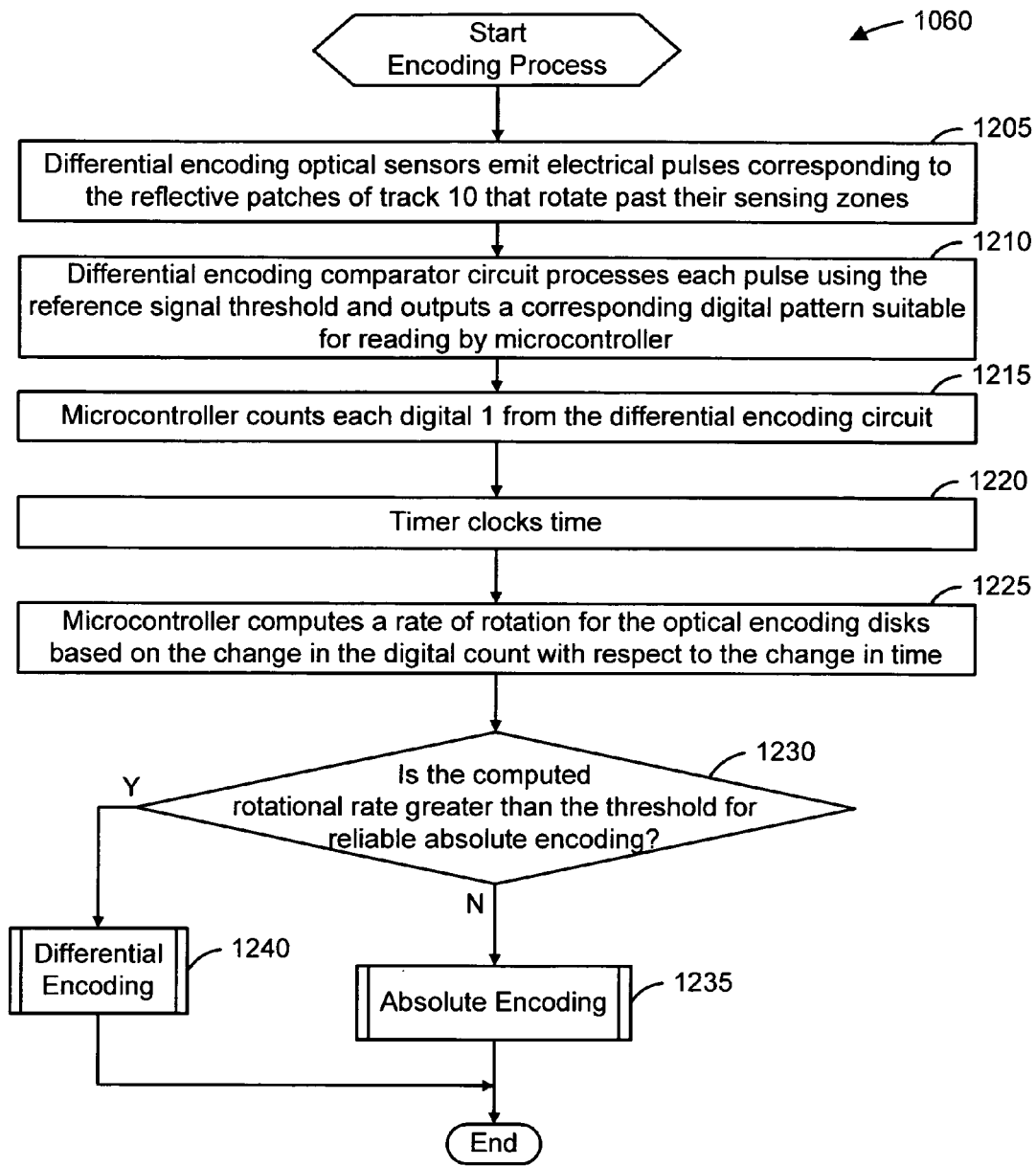
FIG. 12 is a flowchart illustrating an exemplary process for selecting either differential encoding or absolute encoding to determine fluid level in accordance with an embodiment of the present invention.

Turning now to FIG. 12, this figure illustrates a flowchart of an exemplary process 1060, entitled Encoding, for selecting either differential encoding or absolute encoding to determine fluid level in accordance with an embodiment of the present invention. As discussed above in reference to FIG. 10, Process 1000 proceeds with Encoding 1060 after generating reference signals 780, 950 if signals acquired from the reference tracks 425, 450 are suitably distinguished from one another.

At Step 1205, the first step in Process 1060, the differential optical sensors 375k, 375l emit electrical pulses as they sense the alternating pattern of light and dark patches 610, 810 that move through their fields-of-view on track ten 475.

At Step 1210, the differential comparator circuit 925 processes each output pulse. The comparator 930 applies the reference signal 950 to the pulses to generate an alternating pattern of ones and zeros as the comparator output signal 975.

At Step 1215, the microcontroller 215 counts each digital one or each transition between the digital zero state and the digital one state that the differential encoder circuit 925 generates. That is, the microcontroller 215 makes a count of the number of patches 610, 810 that move though the sensor's field-of-view. Each of the total number of patches 610, 810, the number of reflective patches 610, and the number of absorptive patches 810 moving through the field-of-view can be directly related to the amount of disk rotation.

At Step 1220, the microcontroller's timer measures a timeframe for the counting of Step 1215. Thus, the microcontroller 215 determines the number of patches 610, 810 that have moved though the sensor's field-of-view during a known period of time. At Step 1225, the microcontroller 215 computes a rate of optical disk rotation based on the pulse count of Step 1215 and the time measurement of Step 1220. Software executing on the microcontroller 215 can perform this computation by dividing an amount of disk rotation, in units of degrees for example, that occurs during a timeframe by the amount of time, in units of seconds for example, that passes during the timeframe.

Figure 13:
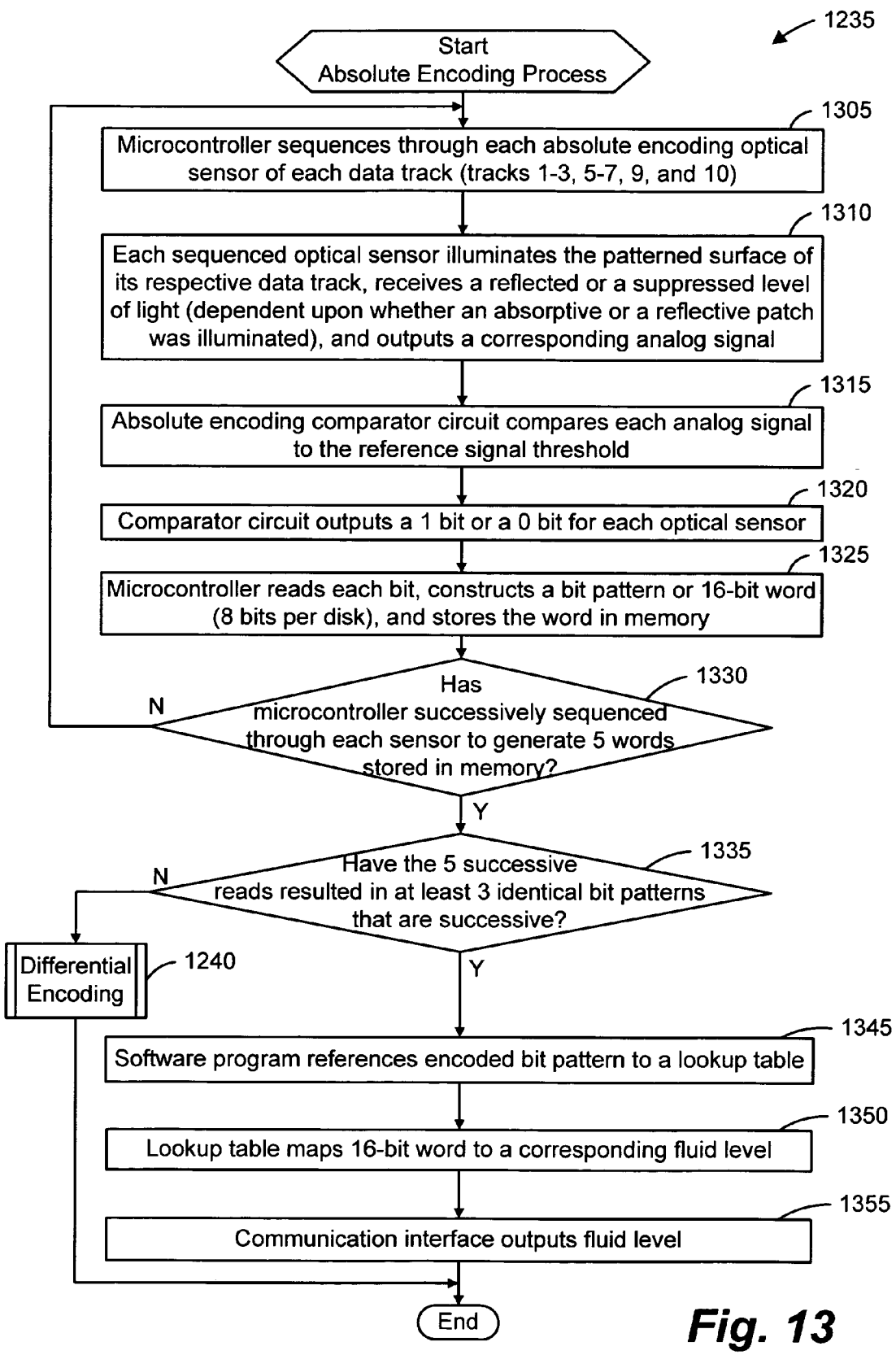
FIG. 13 is a flowchart illustrating an exemplary process for determining fluid level based on absolute encoding in accordance with an embodiment of the present invention.
Figure 14:
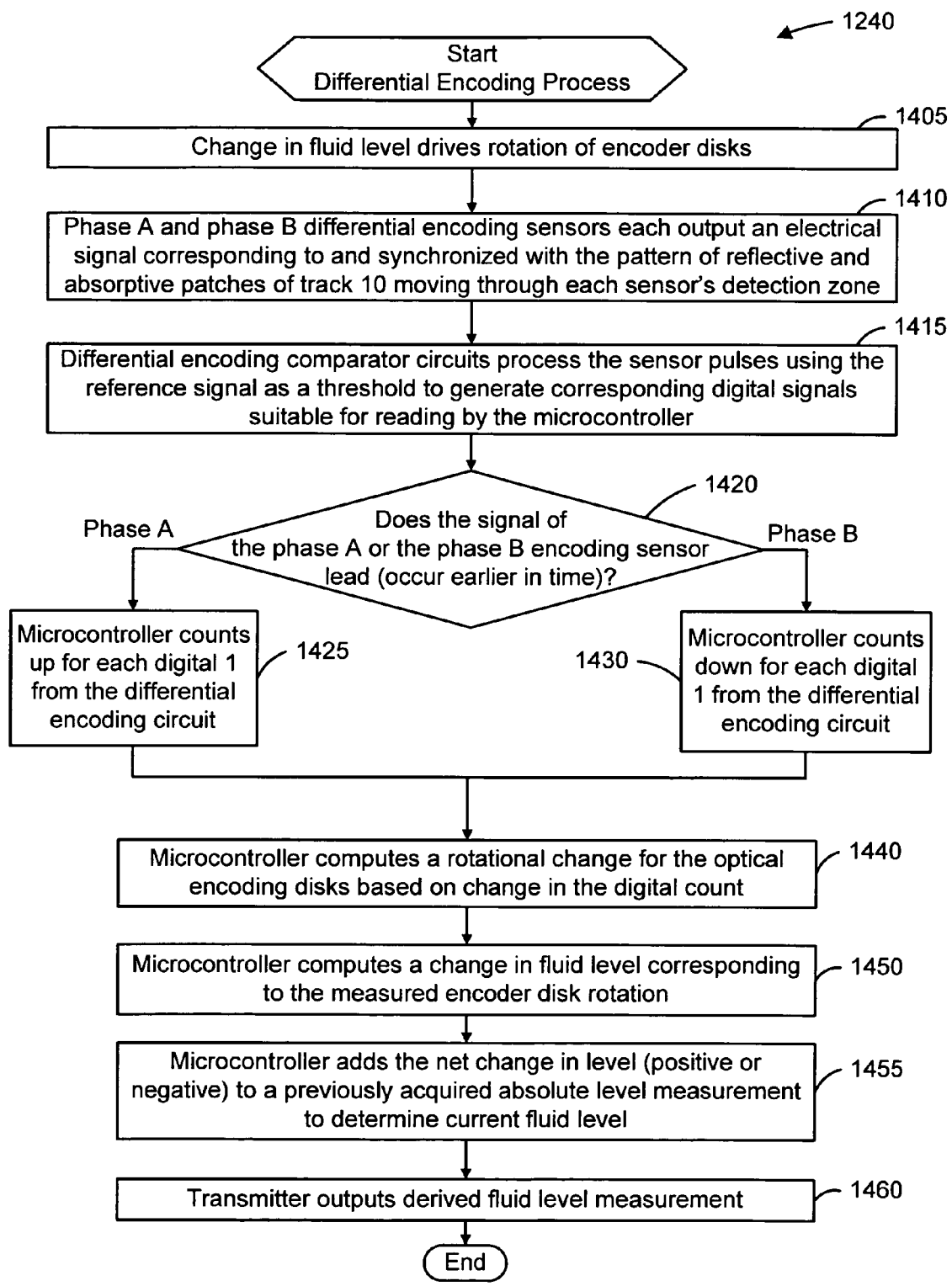
FIG. 14 is a flowchart illustrating an exemplary process for determining fluid level based on differential encoding in accordance with an embodiment of the present invention.

At Step 1230, the microcontroller 215 determines whether the computed rate of disk rotation is greater than a threshold. If the rate is higher than the threshold, the absolute encoder 205 might not provide adequate performance. In this case, Process 1060 executes the Differential Encoding process 1240 that is illustrated in FIG. 14 and discussed below. On the other hand, if the rate is below the threshold, the absolute encoder 205 is expected to provide adequate performance, and Process 1060 executes the Absolute Encoding process 1235 that is illustrated in FIG. 13 and discussed below. Following Step 1240 or Step 1235, Process 1060 ends.

Turning now to FIG. 13, this figure illustrates a flowchart of an exemplary process 1235, entitled Absolute Encoding, for determining fluid level based on absolute encoding in accordance with an embodiment of the present invention. Process 1060 executes the Absolute Encoding process 1235 as Step 1235 if the absolute encoder 205 is likely to provide acceptable measurement performance without using a digital signal processing algorithm as discussed above in reference to FIG. 11.

At Step 1305, the first step in Process 1235, software executing on the microcontroller 215 sequences though and activates each of the absolute encoding optical sensors 375, two of which FIG. 7 illustrates as sensor 375a and sensor 375b. The absolute data sensors 375 are coupled to the data tracks 525, 475 (tracks 1–3, 5–7, 9, and 10). The microcontroller 215 enables each sensor 375 with an activation signal 705, 706.

At Step 1310, each activated sensor 375 illuminates its respective data track 525, 475 in response to the activation signal 705, 706. Each sensor 375 receives a level of light that is indicative of the type of patch 610, 810 (light verses dark) in its field-of-view and generates an analog electrical signal that has a corresponding amplitude.

At Step 1315, the absolute encoding comparator circuit 725 compares the signal from each activated sensor 375 in turn to the reference signal 780. At Step 1320, the comparator 775 applies the reference signal 780 as a threshold and outputs one of two discrete voltages. A low-voltage zero bit corresponds to a dark or absorptive patch 810, while a high-voltage one bit corresponds to a light or reflective patch 610.

At Step 1325, the microcontroller 215 assembles the bits from each sequenced sensor 875, eight per encoder disk 325, into a 16-bit word.

Step 1330 iterates Steps 1305 through 1325 until the microcontroller 215 has acquired five 16-bit words. At inquiry Step 1335, the microcontroller 215 determines if three successively acquired 16-bit words have identical bit patterns. If the five readings did not yield three back-to-back readings with the same bit code, Process 1235 executes the Differential Encoding process 1240 as illustrated in FIG. 14 and discussed below. If three successively acquired 16-bit words are identical, Process 1235 proceeds with Step 1345.

At Step 1345, software executing on the microcontroller 215 references the encoded bit pattern that was successively acquired three times to a lookup table. The lookup table can be a memory-resident matrix of fluid level values matched to 16-bit encoder words. Thus, the lookup table can comprise a level measurement calibration that maps encoder codes to increments of fluid level. The lookup table can receive a 16-bit word, identify the corresponding fluid level measurement, and return that measurement for output by the transmitter 150.

At Step 1350, the lookup table returns a fluid level to the microcontroller 215 based on the 16-bit word. At Step 1355, the communication interface 230 outputs the fluid level measurement. Process 1235 ends following Step 1355 or Step 1340.

Turning now to FIG. 14, this figure illustrates a flowchart of an exemplary process 1240, entitled Differential Encoding, for determining fluid level based on differential encoding in accordance with an embodiment of the present invention. Process 1060 initiates the Differential Encoding process 1240 as Step 1240 if the measured rate of disk rotation indicates a significant probability that the absolute encoder 205 may fail to provide acceptable level measurement. The Absolute Encoding process 1235 initiates Process 1240 if the absolute measurement data exhibit a level of noise or a lack of measurement repeatability that may be problematic or cause for concern, as described above in reference to FIG. 13.

At Step 1405, the first step in Process 1240, a change in the fluid level of the tank 120 provides a rotation of the encoder disks 325. The tape 175 transmits linear motion to the encoder 200 from the float 130, while the rotational drives 315, 305 convert the tape's linear motion into rotational motion.

At Step 1410, the phase A encoder sensor 375k outputs a phase A signal 850 that corresponds to and is synchronized with the sequence of reflective and absorptive patches 610, 810 that pass through its field-of-view. Likewise, the phase B encoder sensor 375l outputs a phase B signal 875 that corresponds to and is synchronized with the sequence of reflective and absorptive patches 610, 810 that pass through its field-of-view. These sensors 375k, 375l view track ten 475 with sensor 375k displaced from sensor 375l by a known fraction of the track's repetitive patch pattern, for example by 90° of phase separation 825.

At Step 1415, the differential encoder comparator circuit 925 processes the signals 850 from sensor 375k. A second differential encoder comparator circuit (not illustrated) processes the signals 875 from the other differential sensor 375l. Each comparator circuit 925 outputs a digital signal 975 or a sequence of digital ones and digital zeroes in a format acceptable to the microcontroller 215. The digital version of the phase A signal 850 is shifted in phase from the digital version of the phase B signal 875 by an amount that corresponds to the physical separation between sensor 375l and 375k along track ten 475. The time shift between the digital versions of these signals 850, 875 is further related to the rotational speed of the encoder disk 325.

At inquiry Step 1420, the microcontroller 215 determines which of the phase A signal 850 and the phase B signal 875 is leading or occurs at an earlier time. That is, an analysis determines whether the phase A sensor 375k or the phase B sensor 375l was the first to view each patch 610, 810 during a disk revolution.

If the phase A signal 850 leads, at Step 1425, the microcontroller 215 increases a base pulse count, that it maintains in a hardware register, for each digital pulse from the differential encoder circuit 975. Conversely, if the phase B signal leads, at Step 1435, the microcontroller 215 decreases the base pulse count for each digital pulse. Software executing on the microcontroller 215 can periodically read the pulse count from the hardware register to determine the count change since the last read. Thus, in one exemplary embodiment of the present invention, the differential encoder 210 can maintain a pulse count outside of the RAM that the microcontroller 215 uses for program execution. In another exemplary embodiment, the pulse count is maintained in RAM by a software routine executing on the microcontroller 215.

At Step 1440, the microcontroller 215 computes a net disk rotation or a clockwise or counterclockwise change in the position of the disk 325 based on the change in the pulse count due to logging new pulses. The computation can multiply the net number of pulses by the disk rotation that corresponds to each pulse, for example.

At Step 1450, the microcontroller 215 computes an increase or decrease in fluid level based on the net disk rotation. The computation can multiple the net disk rotation, for example in degrees, by the amount of fluid level change that corresponds to each unit of disk rotation, for example in unit of inches of fluid level change per degree of disk rotation.

At Step 1455, the microcontroller 215 adds the measurement of net fluid level change to a previously acquired fluid level measurement. The baseline for this previously acquired fluid level measurement is typically a measurement that the transmitter 150 obtained via the Absolute Encoding process 1235. Thus, the microcontroller 215 may add the differential level measurement directly to an absolute measurement or to an earlier differential measurement.

At Step 1460, the transmitter's communications interface 230 outputs the new fluid level measurement under the direction of the microcontroller 215. Process 1240 ends following Step 1460.

The Differential Encoding process 1240 can provide a level operational redundancy so that the transmitter 150 generates robust fluid level measurements when absolute optical encoding is unavailable. With the A/D Encoding process 1045 providing another level of operational redundancy, the transmitter 150 can have at least two levels of encoder-based measurement redundancy beyond its default absolute encoding capability.

It should be emphasized that the above-described embodiments of the present invention are possible examples of implementations, merely set forth to provide a clear understanding of the principles of the invention. Many variations and modifications may be made to the above-described embodiment(s) of the invention without departing substantially from the spirit and principles of the invention. All such modifications and variations are intended to be included herein within the scope of this disclosure and the present invention and protected by the following claims.

What is claimed is:

1. A system for providing a signal corresponding to a fluid level of a vessel comprising:
   a disk, having a pattern of reflective and absorptive marks, operative to rotate in response to a change in the fluid level;
   a source emitting light onto the pattern;
   a detector, adjacent the source, receiving light emanating from the reflective marks and responding to the received light by issuing an output having a relationship with the signal, wherein the issued output comprises a first periodic signal associated with the pattern; and
   a second detector outputting a second periodic signal that leads or lags the first periodic signal based on rotational direction of the disk.

2. The system of claim 1, wherein the second detector and the detector issuing the output comprising the first periodic signal are disposed along a common data track of the disk.

3. The system of claim 1, wherein the first periodic signal and the second periodic signal have an essentially common period.

4. A system for providing a signal corresponding to a fluid level of a vessel comprising:
   a disk, operative to rotate in response to a change in the fluid level, comprising a plurality of tracks patterned with reflective and absorptive marks;
   a source emitting light onto one of the tracks; and
   a detector, adjacent the source, receiving light emanating from the reflective marks of the one of the tracks and responding to the received light by issuing an output that has a relationship with the signal and an operability to provide a measurement of the fluid level; and
   a second and a third detector, each receiving light from the one of the tracks, operative to provide a measurement of the change in the fluid level.

5. The system of claim 4, wherein providing the measurement of the change in the fluid level comprises counting pulses from the second detector.

6. The system of claim 4, further comprising a computer program operative to apply the measurement of the change in the fluid level to the measurement of the fluid level.

7. The system of claim 6, wherein applying the measurement of the change in the fluid level to the measurement of the fluid level comprises increasing or decreasing the measurement of the fluid level based on a phase shift between an output of the second detector and an output of the third detector.

8. The system of claim 6, wherein:
   the second detector generates a second signal and the third detector generates a third signal having a time shift with respect to the second signal; and
   the applying step comprises subtracting the measurement of the change in the fluid level from the measurement of the fluid level if the time shift is positive and adding the measurement of the change in the fluid level to the measurement of the fluid level if the time shift is negative.

9. A system for providing an indication of a fluid level comprising:
a surface comprising a patterned region proximate to a first sensor and a uniform region proximate to a second sensor;
a linkage operative to provide relative motion between the surface and the first sensor in response to a change in the fluid level; and
a circuit operative to:
receive a first signal from the first sensor according to the patterned region and a second signal from the second sensor according to the uniform region; and
generate the indication of the fluid level in response to comparing the first signal to the second signal.

10. The system of claim 9, wherein the first signal corresponds to the relative motion.

11. The system of claim 9, wherein the first signal corresponds to a position of the surface.

12. The system of claim 9, wherein the patterned region comprises a pattern of light and dark marks and the uniform region comprises a light mark.

13. The system of claim 9, wherein the patterned region comprises a pattern of light and dark marks and the uniform region comprises a dark mark.

14. The system of claim 9, wherein the circuit comprises a comparator coupled to the first sensor and the second sensor, the comparator operative to compare the first signal to the second signal.

15. The system of claim 9, wherein each of the first and second sensors emits light onto the surface and collects the light where reflected from the surface.

16. The system of claim 9, wherein a rotating disk comprises the surface.

17. The system of claim 9, wherein the patterned region comprises a circular track of optically reflective and optically suppressive patches.

18. The system of claim 9, wherein:
the first sensor is positioned to track a path through the patterned region that traverses light and dark patches; and
the system further comprises a third sensor optically coupled to the path and displaced from the first sensor.

19. The system of claim 18, wherein the third sensor is operative to output a third signal that is shifted from the first signal according to the displacement between the first sensor and the third sensor.

20. The system of claim 18, wherein the third sensor generates a third signal that leads the first signal if the fluid level is increasing and lags the first signal if the fluid level is decreasing.

21. The system of claim 18, wherein comparing the first signal to the second signal provides compensation for aging of the surface.

22. The system of claim 9, wherein the circuit is operative to compensate for variation in the first signal associated with an environmental effect.

23. The system of claim 8, wherein:
the first signal is encoded with information for an absolute fluid level;
the system further comprises a third sensor, coupled to the patterned region, operative to output a third signal encoded with information for a fluid level differential; and generating the indication of the fluid level comprises combining the fluid level differential and the absolute fluid level.

24. The system of claim 9, wherein generating the indication of the fluid level comprises:
estimating a fluid level change corresponding to the relative motion based on comparing the first signal to the second signal;
estimating a base fluid level using a third sensor proximate to the patterned region; and
adding the estimated fluid level change to the estimated base fluid level to calculate the fluid level.

25. A fluid level transmitter comprising:
an optical encoder, comprising a sensor circuit, that provides a digital output according to a position of a disk;
a drive unit, operative to rotate the disk in response to fluid level change, whereby rotation of the disk results in an alteration of the digital output;
a communications interface, operative to transmit a fluid level measurement that is based on the digital output; and
a user interface, comprising an optical source that outputs visible light in a pattern corresponding to the digital output.

26. The transmitter of claim 25, wherein the user interface comprises a diagnostic interface.

27. The transmitter of claim 26, wherein the optical encoder and the optical source are enclosed in a common housing.

28. The transmitter of claim 27, wherein the common housing is explosion proof.

29. The transmitter of claim 26, further comprising a galvanically isolated power supply, operative to provide electrical power to the optical encoder, the communications interface, and the user interface.

30. The transmitter of claim 25, wherein:
the optical encoder further comprises:
a first sensor operative to provide a differential fluid level measurement;
a second sensor operative to provide an absolute fluid level measurement; and
the transmitter further comprises a microprocessor that derives the fluid level measurement from the differential fluid level measurement and the absolute fluid level measurement.

31. The transmitter of claim 25, wherein the optical encoder comprises a differential encoder and an absolute encoder.

32. A method for determining a fluid level comprising the steps of:
translating linear motion associated with a change in the fluid level into rotation of an object;
emitting light toward the object;
receiving the emitted light emanating from the object;
determining whether the object has a speed of rotation that is less than a threshold;
if the speed of rotation is less than the threshold, analyzing the received light to determine the fluid level based on a rotational position of the object; and
if the speed of rotation is greater than the threshold, analyzing the received light to determine the fluid level based on a change in the rotational position of the object.

33. The method of claim 32, wherein receiving the emitted light emanating from the object comprises receiving reflected light.

34. The method of claim 32, wherein analyzing the received light to determine the fluid level based on the rotational position of the object comprises comparing the received light to a reference.

35. The method of claim 34, wherein comparing the received light to the reference comprises receiving reference light from a first and a second region of the object.

36. The method of claim 35, further comprising the steps of:
determining if the received reference light from the first region is within an intensity threshold of the received reference light from the second region;
if the received reference light from the first region is within the intensity threshold, analyzing the received light using a computer program that performs a statistical computation; and
if the received reference light from the first region is outside the intensity threshold, comparing the received light to an analog form of the reference.

37. The method of claim 36, wherein analyzing the received light using the computer program comprises digital signal processing of an electrical signal.

38. The method of claim 32, wherein analyzing the received light to determine the fluid level based on the change in the rotational position of the object comprises comparing the received light to a reference.

39. A computer-based method for determining a fluid level comprising the steps of:
rotating a disk according to the fluid level;
encoding the disk rotation using a first encoding mode;
determining if the first encoding mode provides acceptable encoding performance;
if the first encoding mode does not provide acceptable encoding performance, encoding the disk rotation using a second encoding mode; and
computing a measurement of the fluid level based on the encoded disk rotation.

40. The computer-based method of claim 39, wherein encoding the disk rotation using the first encoding mode comprises determining an absolute position of the disk.

41. The computer-based method of claim 40, wherein encoding the disk rotation using the second encoding mode comprises determining a differential position of the disk.

42. The computer-based method of claim 39, further comprising the steps of:
determining if the second encoding mode provides acceptable encoding performance; and
if the second encoding mode does not provide acceptable encoding performance, encoding the disk rotation using a third encoding mode.

43. The computer-based method of claim 39, wherein encoding the disk rotation using the third encoding mode comprising processing an encoder signal with a digital signal processing program.

* * * * *